US006605337B1

(12) United States Patent
Mori et al.

(10) Patent No.: US 6,605,337 B1
(45) Date of Patent: Aug. 12, 2003

(54) RECORDING MATERIAL

(75) Inventors: Kenichi Mori, Ohtsu (JP); Kazuyuki Tsuchiiwa, Ohtsu (JP); Katsuya Ito, Ohtsu (JP); Toru Kotani, Ohtsu (JP); Yasushi Sasaki, Ohtsu (JP)

(73) Assignee: Toyo Boseki Kabushiki Kaisha, Osaka (JP)

(*) Notice: Subject to any disclaimer, the term of this patent is extended or adjusted under 35 U.S.C. 154(b) by 0 days.

(21) Appl. No.: 09/558,633

(22) Filed: Apr. 26, 2000

(30) Foreign Application Priority Data

| | | |
|---|---|---|
| Apr. 28, 1999 | (JP) | 11-122742 |
| Apr. 28, 1999 | (JP) | 11-122743 |
| May 31, 1999 | (JP) | 11-150900 |
| May 31, 1999 | (JP) | 11-151546 |
| May 28, 1999 | (JP) | 11-149299 |
| May 28, 1999 | (JP) | 11-150094 |
| May 28, 1999 | (JP) | 11-150095 |
| May 28, 1999 | (JP) | 11-150442 |
| May 28, 1999 | (JP) | 11-150776 |

(51) Int. Cl.$^7$ .......................... B32B 27/14; B32B 3/00

(52) U.S. Cl. ...................... 428/195; 428/206; 428/332; 428/480

(58) Field of Search ............................. 428/195, 206, 428/332, 480

(56) References Cited

U.S. PATENT DOCUMENTS

| | | | | |
|---|---|---|---|---|
| 4,946,741 A | | 8/1990 | Aono et al. | |
| 5,407,893 A | | 4/1995 | Koshizuka et al. | |
| 5,561,454 A | | 10/1996 | Kurabayashi et al. | |
| 5,612,281 A | | 3/1997 | Kobayashi et al. | |
| 6,214,458 B1 | * | 4/2001 | Kobayashi et al. | 428/332 |

FOREIGN PATENT DOCUMENTS

| | | |
|---|---|---|
| EP | 0 570 899 A1 | 11/1993 |
| EP | 0 602 326 A1 | 6/1994 |
| EP | 0 605 840 A2 | 7/1994 |
| EP | 0 824 077 A2 | 2/1998 |
| EP | 0 841 185 A1 | 5/1998 |
| EP | 0 854 051 A1 | 7/1998 |
| EP | 0 896 883 A1 | 2/1999 |
| JP | 61035275 | 2/1986 |
| JP | 3133687 | 6/1991 |

* cited by examiner

*Primary Examiner*—Bruce H. Hess
*Assistant Examiner*—B. Shewareged
(74) *Attorney, Agent, or Firm*—Leydig, Voit & Mayer, Ltd.

(57) ABSTRACT

A recording material comprising a substrate and an ink receiving layer formed thereon, wherein said substrate has a thickness of 38–200 $\mu$m, said ink receiving layer is a porous layer comprising particles and a resin and has a thickness of not less than 40 $\mu$m and not more than 105 $\mu$m, and wherein the recording material has a curl value of not more than +10 mm, and a recording material comprising a substrate and an ink absorption layer formed thereon, wherein the ink absorption layer has a surface strength of not less than 80 g weight/cm. The recording material thus obtained affords sharp recording of images having extremely high water resistance and free of bleeding by the ink jet recording method particularly using oily ink. The material hardly curls even under severe environment associated with radically changing humidity, temperature and the like, thereby ensuring stable transportability of the recording material without trouble caused by being in contact with a priting head. When used as an illumination signboard, moreover, the recording material affords superior images that are maintained when the illumination signboard is on or off.

28 Claims, No Drawings

RECORDING MATERIAL

TECHNICAL FIELD OF THE INVENTION

The present invention relates to a recording material suitable for various recording methods. More particularly, the present invention relates to a recording material that permits stable and continuous printing under any environment. Still more particularly, the present invention relates to a recording material suitable for the ink jet recording method, particularly a recording material that permits stable continuous printing even under high temperature and high humidity or low temperature and low humidity, by the ink jet recording method using oily ink, and to a recording material having high surface strength of an ink absorption layer.

BACKGROUND OF THE INVENTION

Along with the growth of the capability of computers and spreading of the computers in recent years, the hard copy technique has rapidly developed. As the hard copy method, there are known a sublimation transfer recording method, an electronography method, an ink jet method and the like.

In printers by an ink jet method, an ink drop is jet out at a high speed from a nozzle toward a recording material to form images. Printers for this method are rapidly prevailing as peripheral apparatus of personal computers for printing in offices and homes because they permit easy colorizing and minituarization, and they generate lower printing noise. In view of the good quality of recorded products, that is comparable to that of silver salt photographs, and easiness of jumboizing, the application in industrial fields as printers for making large signboards, posters, illumination signboards and the like has been expected. Among others, its use is drawing particular attention for printing of a product to be appreciated in illumination where the light is shot from the back.

The ink to be used for the ink jet method is aqueous dye ink, which is obtained by dissolving various water soluble dyes in water or a mixed solvent of water and hydrophilic solvent and adding various agents where necessary. This is because aqueous ink can afford vivid color recording, permits easy adjustment of the viscosity of ink, is free of solvent smell and is superior in safety.

In the meantime, various methods have been proposed to overcome defects that aqueous dye ink printed on a water soluble resin-containing layer formed on a support has inferior water resistance and weatherability (U.S. Pat. No. 5,561,454). However, none of them shows capability to allow outdoor exhibition, and there arises a need to apply an ultraviolet absorptive laminate film to the surface to prevent discoloration of dye due to ultraviolet rays. This causes an increase of the cost.

To compensate for the defects of the aqueous dye ink, ink obtained by dispersing aqueous pigment ink, i.e., an organic or inorganic pigment, in water or a mixed solvent of water and hydrophilic solvent, and adding various additives, has been proposed. When aqueous pigment ink is used for recording, it is possible to afford complete water resistance if a recorded material after printing is thoroughly dried. This has resulted in a striking increase in use nowadays. Due to the use of water as the main solvent, however, the concentration of pigment cannot be made high, resulting in inferior color development and vividness, and frequent clogging of the head nozzle.

To solve these problems, the ink jet method using oily ink has been proposed. Oily ink is obtained by dissolving or dispersing oil soluble dye, organic pigment, inorganic pigment and the like in solvents such as paraffins, ethers, alcohols and the like. When compared to aqueous dye ink and aqueous pigment ink, it has advantages in that it allows selection of dye and pigment from a wide range of color materials having superior weatherability and water resistance; it can realize high image density because it can be dissolved or dispersed in a solvent at a high concentration; it causes less clogging of the head; it suffers less from cockling due to water absorption by a sheet; it can lower surface tension of ink; it shows higher permeability into a recording material; and the like. The oily ink is promising as a substitute for aqueous ink in the field where high speed printing, high picture quality printing and good weatherability are required, and a recording material suitable for the oily ink has been proposed (JP-A-3-133687).

As the recording material, there have been proposed various materials that can provide a recorded product having superior quality using aqueous dye ink or aqueous pigment ink. For example, there have been proposed a material having a porous layer formed on a support, which contains a pigment and a resin, a back print method in which a non-transparent receiving layer (ink receiving layer) is formed on a transparent support and images are appreciated from the surface opposite from the recorded surface (JP-A-61-35275), and further, various additives to improve property such as water resistance, bleeding and the like.

The recording materials disclosed in the above-mentioned publications are all designed for aqueous dye or aqueous pigment. When these materials are used for recording with oily ink, a fine recorded product cannot be always obtained. This is because the ink receiving layer of a recording material suitable for aqueous ink generally comprises a water soluble resin or water absorptive resin as a constituent material aiming at absorbing water in the ink. These resins show poor solvent absorption capability and the aqueous ink shows different behavior from oily ink; that is, the dye or pigment in the aqueous ink has electric charge and it has a high surface tension because of the main solvent being water. Therefore, a recording material capable of showing the maximum advantage of oily ink does not exist. Moreover, a recording material suitable for aqueous ink, which uses a resin with good water absorption as a material constituting the ink receiving layer, shows markedly different water absorption by water absorptive resin depending on humidity, thus leading to changes in volume of resin itself. As a result, a recording material gets curled up to make handling of the material difficult under high temperature and high humidity or under low temperature and low humidity. This in turn causes frequent occurrence of trouble during transport of paper in a printer when images are continuously printed.

Inasmuch as printing by the ink jet method is greatly influenced not only by the capability of the printers but also by the property of the recording material, various recording materials have been developed. Of these is a recording material for a so-called back print method, which comprises an ink absorption layer and an ink passage layer laminated on a translucent substrate, and which is printed from the ink passage layer side for appreciation from the substrate side (JP-A-61-35275). This method provides uniform gloss and photograph-like images because it is appreciated from the substrate side. However, conventional back print films are defective in that they have poor workability such as adhering of recorded product because the ink absorption layer of the films has low surface strength.

It is therefore an object of the present invention to provide a recording material suitable for the ink jet recording method. Particularly, the present invention provides a recording material suitable for the ink jet recording method using oily ink, which has the following characteristics.

1. Being free of curling under high temperature and high humidity, or under low temperature and low humidity, being able to be handled and carried in a stable manner, and forming sharp images free of bleeding but with fine water resistance.
2. Being capable of providing images having water resistance sufficient for outdoor exhibition, particularly superior color density retention proportion.
3. Being capable of providing, when used as an illumination signboard, high image density, superior color development, high picture quality and fine water resistance, particularly, being capable of providing superior images not only when illumination is on but also when it is off.

Another object of the present invention is to improve workability of a recording material, preferably a recording material subjected to ink jet recording, which can be used for illumination where light is shot from behind.

SUMMARY OF THE INVENTION

The present inventors have studied with the aim of maximizing the capability of oily ink and found that the use of a recording material comprising a substrate and an ink receiving layer formed thereon, wherein the substrate and the ink receiving layer have specific thicknesses and the ink receiving layer is porous, in a ink jet recording method using oily ink, results in a recording material which is associated with less curling even when used under severe environmental conditions, such as high temperature and high humidity, or low temperature and low humidity, which affords stable continuous printing, and which forms sharp images free of bleeding but with fine water resistance.

Accordingly, the present invention provides a recording material having a curl value as a recording material of not more than +10 mm, which comprises a substrate and an ink receiving layer formed thereon, wherein said substrate has a thickness of 38–200 μm, and said ink receiving layer is porous, has a thickness of not less than 40 μm and not more than 105 μm and comprises particles and a resin.

With the aim of improving the workability of an ink jet recording material to be beneficially used particularly for illumination, the present inventors investigated and found that the recording material having the following constitution can achieve the object.

In accordance with the present invention, therefore, there has now been provided a recording material to be appreciated from the substrate side, which has a surface strength of an ink absorption layer of not less than 80 g wt/cm (0.0195 N/m), by forming an ink absorption layer B on a translucent substrate A and making ink absorbed from the ink absorption layer side, followed by fixation of the image.

DETAILED DESCRIPTION OF THE INVENTION

According to the recording material of the present invention, a resin, preferably a water non-absorptive resin is used as a binding material of the particles in the ink receiving layer to make water resistance fine, and the thickness of a porous ink receiving layer is set within a certain range to make the recording quality with oily ink excellent, whereby a recording material free of curling is obtained. This material is free of curling even under high temperature and high humidity or under low temperature and low humidity, and even after lamination on a substrate, which is attributable to the fact that variation in the volume of the resin due to absorption or release of water is slight.

According to the present invention, the binding material is a water non-absorptive thermoplastic resin. Therefore, a porous ink receiving layer having superior water resistance can be formed and curling of the recording material is suppressed. To be specific, the curl value of the recording material needs to be not more than +10 mm, preferably not more than 8 mm. As used herein, the curl value is measured by a method wherein two sheets of recording materials are set on a mat board with the ink receiving layer of one recording material facing upward and that of the other material facing downward, the materials are left standing for 24 hours in an environment of 20° C./60% RH, 15° C./20% RH and 30° C./80% RH, and the height of each corner of the materials is measured. When the measure is a "+value", the curling occurred with the ink receiving layer inwardly bent and when the measure is a "−value", the curling occurred with the ink receiving layer outwardly bent. The curl value may be a "−value", but it is preferably not less than −30 mm.

When the curl value exceeds +10 mm, transportability becomes inferior, sometimes making printing unattainable.

A recording material comprising an ink receiving layer formed on a substrate is made to have the relationship between color density T upon transmission of light and color density R upon reflection with regard to black solid print, which satisfies the following formula $$1.20 \times R \leqq T \leqq 1.70 \times R$$

wherein color density (T) upon transmission and color density (R) upon reflection are measured by the use of Macbeth densitometer TR-927, and black solid print is made using ink jet printer IJP-3600 manufactured by OLYMPUS OPTICAL COMPANY LIMITED and pure oily pigment ink, by semi 720 dpi mode at K100%.

As a result, vivid images can be obtained by casting light from the back or without casting light, thereby making its illumination use available.

Substrate

The thickness of the substrate is 38–200 μm, preferably 50–188 μm. When the thickness is less than 38 μm, the substrate has less rigidity and suffers from waving and curling due to a slight dimensional change such as swelling and shrinkage of the ink receiving layer. When it exceeds 200 μm, the production cost increases and flexibility becomes less, making handling difficult, though the recording material is free from deformation due to dimensional changes in the ink receiving layer.

In the present invention, the material of the substrate is free of any particular limitation. When a recording material after printing is adhered to a wall, a non-transparent substrate is preferably used so as to cover the base. When it is used for illumination signboard where light is shot from the back, a translucent substrate is preferably used.

The translucent substrate may be, for example, polyester, polystyrene, polypropylene, polyamide, polycarbonate, polynorbornene, Vinylon (polyvinyl alcohol) and acrylic plastic films or sheets (hereinafter sometimes referred to simply as a sheet which includes film), glass or a combination of two or more from these that have been adhered to each other. Preferably, transparent polyester resin sheet and film are preferable, which are superior in heat resistance and flexibility. Of the polyester resins, moreover, polyethylene terephthalate (PET) is particularly preferable, which is superior in transparency, strength, adhesive property of the ink receiving layer, durability and cost.

When it is used for illumination signboard and the like, the substrate is preferably translucent. The degree of preferable transparency of the translucent substrate in terms of total light transmittance according to JIS K 7105 is not less than 85%. When the total light transmittance is less than 85%, the printed images lighted from the back may not be vivid enough.

As the polyester resin sheet, any known polyester resin sheet can be used without limitation. In the present invention, a resin sheet comprising, as a main component, a polyester resin produced by condensation polymerization of aromatic dicarboxylic acid (e.g., terephthalic acid, isophthalic acid, naphthalenedicarboxylic acid etc.) or an ester thereof, and glycol (e.g., ethylene glycol, diethylene glycol, 1,4-butanediol, neopentyl glycol etc.) is used.

The polyester resin sheet used in the present invention as a translucent substrate preferably comprises a sheet obtained by at least uniaxially stretching the above-mentioned resin as the substrate. By stretching, the strength increases and economical aspect is also improved.

The polyester resin sheet is stretched by a tubular method, simultaneous biaxial orientation, sequential biaxial orientation and the like, without limitation. Of these, sequential biaxial orientation is preferable in view of planarity, fine dimensional stability and less variation in thickness. For sequential biaxial orientation, a sheet is roll stretched 2.0 to 5.0 times in the longitudinal direction at (glass transition temperature of polyester +0 to +30)°C., and sequentially tenter stretched 1.2 to 5.0 times at 120–150° C. After stretching, heat setting is applied while relaxing by 3–8% at not less than 220° C.

The translucent substrate to be used for the recording material of the present invention may be a composite film comprising two or more layers laminated on one another. Such a composite film can be produced by a known method for producing a composite film, without particular limitation. In consideration of the productivity, however, a laminate produced by coextrusion is most preferable, wherein a material constituting each layer of the composite film is extruded from separate extruders, led to a single die, laminated to give an unstretched sheet made from the resin mixture, and at least uniaxially oriented.

In the present invention, the non-transparent substrate is not particularly limited. For example, a polyester, polystyrene, polypropylene, polyamide, polycarbonate, polynorbornene, vinylon, acrylic plastic film or sheet, or a non-transparent resin film obtained by mixing an inorganic pigment and a foaming agent with these materials, polyester cloth, polyester/cotton composite cloth, cotton cloth, nonwoven fabric, pulp, resin impregnated paper, cast coat paper, resin coat paper, glass paper and two or more optional kinds therefrom adhered to each other can be used. Preferably, non-transparent polyester paper superior in heat resistance and flexibility is used. The preferable degree of non-transparency expressed in total light transmittance is not more than 60%. When the total light transmittance exceeds 60%, non-transparency becomes inferior, showing the back when adhered to a wall etc.

The non-transparent substrate to be used in the present invention is preferably non-porous. This has a consequence that penetration of ink or solvent in the ink into a substrate can be prevented, which in turn prevents lowering of the substrate strength and setoff during storage of superposed recorded materials after printing. Being nonporous means that a material contains a number of voids inside but no opening faces the outside.

The polyester paper may be a known polyester paper without any limitation. In the present invention, the use of void-containing polyester paper, which is a non-transparent film containing voids in the polyester resin, obtained by condensation polymerization of aromatic dicarboxylic acid (e.g., terephthalic acid, isophthalic acid, naphthalenedicarboxylic acid) or its ester, and glycol (e.g., ethylene glycol, diethylene glycol, 1,4-butanediol, neopentyl glycol etc.) is particularly preferable.

In the above-mentioned void-containing polyester paper, the voids are formed by a known method. Preferably, a thermoplastic resin incompatible with the following polyester is added, melted, extruded to give an unstretched sheet, and the sheet is at least uniaxially stretched, whereby fine voids are formed inside the sheet in a great number.

The thermoplastic resin incompatible with the polyester may be polystyrene resin, polyolefin resin, polyacrylic resin, polycarbonate resin, polysulfone resin, cellulose resin and the like. Particularly, polystyrene resin, polyolefin resin such as polymethyl pentene, polypropylene and the like are preferably used.

The unstretched sheet made from a resin mixture comprising a polyester and a thermoplastic resin incompatible with the polyester can be produced by, for example, a method comprising mixing and melt-kneading the chips of each resin in an extruder and extruding and setting; a method comprising kneading both resins in a kneader, melt extruding the mixture from an extruder and setting; or a method comprising adding, during polymerization of polyester, a thermoplastic resin incompatible with polyester, stirring and dispersing the mixture to give chips, melt extruding the chips and setting. The unstretched sheet obtained by curing is generally without orientation or after weak orientation. The thermoplastic resin incompatible with the polyester are present in the polyester in various forms (e.g., sphere, oblong sphere, yarn etc.) after dispersion.

The amount of the thermoplastic resin incompatible with the polyester varies depending on the desired amount of voids. It is preferably 3 wt %–40 wt %, particularly preferably 6–35 wt %, of the entire mixture. When it is less than 3 wt %, the number of voids formed is limited and the desired flexibility, light weight and drawability cannot be attained. When it exceeds 40 wt %, heat resistance, strength and particularly rigidity of the polyester film are drastically impaired.

The polyester paper preferably contains inorganic particles to enhance opacifying property and printability as necessary. The inorganic particles to be added may be, but not particularly limited to, titanium dioxide, silicon dioxide, calcium carbonate, barium sulfate, aluminum oxide, kaoline, talc and the like.

The resin mixture, from which non-transparent polyester paper containing voids is formed, may contain coloring material, ultraviolet absorbent, fluorescent whitening dye, antistatic, viscosity reducing agent, antioxidant and the like depending on use.

The non-transparent substrate to be used as the recording material of the present invention, preferably void-containing polyester paper, may be a composite film comprising two or more layers laminated on one another. Such composite film can be produced by the same method as employed for the translucent substrate.

A polyester paper can be produced from a resin mixture by a tubular method, simultaneous biaxial orientation, sequential biaxial orientation and the like, without limitation. Of these, sequential biaxial orientation is preferable in view of planarity, fine dimensional stability and less variation in thickness. For sequential biaxial orientation, a sheet is roll stretched 2.0 to 5.0 times in the longitudinal direction at (glass transition temperature of polyester +0 to +30)°C., and sequentially tenter stretched 1.2 to 5.0 times at not less than 220° C. After stretching, heat setting is applied while relaxing by 3–8% at not less than 220° C.

The non-transparent substrate is preferably white, and has a preferable value ranges as measured according to JIS Z 8730 and expressed by L*, a* and b* of $L^* \geqq 80$, $-5 \leqq a^* \leqq 5$ and $-5 \leqq b^* \leqq 5$.

In the present invention, a porous layer, which is an ink receiving layer, is directly formed on a translucent or non-transparent substrate to give a recording material. It is also a beneficial embodiment to form an anchor layer between a substrate and a porous layer (ink receiving layer).

Anchor Layer

This anchor layer is for enhancing the adhesion between the substrate and the ink receiving layer. The anchor layer is constituted by a resin such as polyester resin, polyurethane resin, polyesterurethane resin, acrylic resin and melamine resin, or a mixture thereof.

The above-mentioned anchor layer may contain various particles for an improved slip property and enhanced adhesion to a porous layer. For example, inorganic particles such as silica, kaolinite, talc, calcium carbonate, zeolite, alumina, barium sulfate, carbon black, zinc oxide, titanium oxide etc, and organic particles such as acrylic resin, polyamide resin, styrene resin, polyester resin, benzoguanamine-formaline condensed resin and the like can be used.

Moreover, the anchor layer may contain surfactant, antistatic, fluorescent dye, fluorescent whitening dye, ultraviolet absorber and the like for various purposes.

The anchor layer can be formed by gravure coat method, kiss coat method, dip method, spray coat method, curtain coat method, air knife coat method, blade coat method, reverse roll coat method and the like, which are conventional methods. An anchor layer is formed during forming a film (inline coat method) or formed after forming a film (offline coat method). Preferably, an inline coat method is employed for economic reasons.

According to the present invention, a porous ink receiving layer is formed directly on a translucent or non-transparent substrate or via an anchor layer to give a recording material.

Ink Receiving Layer (Porous Layer)

The thickness of the ink receiving layer is not less than 40 μm and not more than 105 μm, preferably not less than 50 μm and not more than 105 μm. By making the ink receiving layer a porous layer of not less than 40 μm and not more than 105 μm, a recording material capable of showing fine recording quality when used as a recording material for a printer having a large discharge amount, which is designed for large signboard, poster, illumination signboard and the like, can be obtained. When the thickness of the ink receiving layer is less than 40 μm, ink absorption amount is insufficient, which causes bleeding at color blending part and insufficient color density when used for the production of an illumination signboard. When it exceeds 105 μm, powder fall out occurs when the material is cut.

By making the ink receiving layer a porous layer containing particles and a resin, the color density retention proportion of the obtained recording material as expressed by the following formula can be set to not less than 95%. Consequently, a recording material having fine water resistance that allows outdoor exhibition can be obtained by the ink jet recording method using oily ink.

$$\text{color density retention proportion } (\%) = [(\text{color density after test}) / (\text{color density before test})] \times 100$$

wherein the test comprises immersing a specimen in water for one hour and subjecting the specimen to 50 reciprocation friction test (load: 200 g, moved distance: 100 mm, moving speed: 30 reciprocations per minute, gauze for friction: Japan Pharmacopoeia type I, 2 sheets superimposed) using friction test machine II type as defined in JIS L-0849. After the test, the specimen is washed lightly, dried at 160° C. for 3 minutes and measured for color density. The color density is measured using a Macbeth densitometer TR-927.

To be specific, a water non-absorptive thermoplastic resin was used for forming an ink receiving layer, thereby to set the color density retention proportion of the recording material to not less than 95%. As a result, printed part of the ink receiving layer after printing became less bleeding upon mutual action with the oily ink, and water resistance was improved thereby. In this way, a recording material having fine recording quality with oily ink was obtained. In addition, by making the ink receiving layer a porous layer, a recording material capable of showing fine recording quality when used as a recording material for a printer having a large discharge amount, which is designed for large signboard, poster, illumination signboard and the like, is obtained. When the color density retention proportion of the above-mentioned recording material is less than 95%, water resistance becomes insufficient.

Such porous layer can be formed by a method subject to no particular limitation. For example, the method may comprise applying a coating solution containing particles and a resin in water or a mixture of water and hydrophilic solvent to a substrate and drying, or comprise applying a coating solution containing particles and a resin in an organic solvent and drying. Preferably, a method using water as the main solvent, wherein a coating solution containing particles and a resin in water or a mixture of water and hydrophilic solvent is applied, is preferable.

Examples of the particles that constitute the porous layer include inorganic particles such as silica, kaolinite, talc, light calcium carbonate, heavy calcium carbonate, zeolite, alumina, barium sulfate, carbon black, zinc oxide, zinc sulfate, zinc carbonate, titanium dioxide, aluminum silicate, diatomaceous earth, calcium silicate, aluminum hydroxide, magnesium carbonate, magnesium hydroxide and the like, and particles of resins such as acrylic or methacrylic, vinyl chloride, vinyl acetate, nylon, styrene/acrylic, polystyrene/butadiene, polystyrene/acrylic, polystyrene/isoprene, polystyrene/isoprene, methyl methacrylate/butyl methacrylate, melamine, polycarbonate, urea, epoxy, urethane, phenol, diallylphthalate and polyester.

These particles preferably have a particle size of 0.1–30 μm, more preferably 0.5–20 μm (measured by a Coulter counter, hereinafter the same).

Of the above-mentioned particles, the use of silica particles, particularly the use of synthetic amorphous silica having fine pores on the surface, is preferable for the absorption of organic solvent.

The silica particles preferably have an average particle size of secondary agglomerated particles of 0.1 μm–30 μm, diameter of fine pore of 10–2000 Å. Where necessary, the surface of the particles may be modified. For the surface treatment, a chemical treatment using organic silane, organic titanate and the like, a physical treatment wherein paraffin wax, glycol compound etc. are simply attached to the surface are exemplified.

Such silica particles may be obtained from the market. For example, MIZUKASIL manufactured by MIZUSAWA INDUSTRIAL CHEMICALS, LTD., CARPLEX manufactured by Shionogi & Co., Ltd., SYLYSIA manufactured by Fuji Silysia Chemical LTD., SYLOJET manufactured by GRACE JAPAN KK. and the like can be used.

The material for binding particles is preferably a water non-absorptive thermoplastic resin. The use of a thermoplastic resin affords fluidity upon heating in the drying step, which provides a layer with less distortion or surface roughness. Moreover, the use of a water non-absorptive resin enables forming of a layer having superior water resistance. In this way, the characteristics of oily ink superior in water resistance and weatherability can be utilized.

The binding material is a water non-absorptive thermoplastic resin preferably having a glass transition temperature (Tg) of −5° C. to 100° C. When the glass transition temperature is high, the fluidity in the drying step becomes inferior, and a film is tend to be formed particularly on the surface which is dried first, making ink absorption on the surface inferior. When the glass transition temperature is too low, the fluidity during the drying step becomes too fine and the resin tends to gather on the substrate side. As a result, the amount of the resin that binds particles on the surface becomes smaller, which in turn lowers the surface strength.

Examples of the aforementioned thermoplastic resin to be used as the binding material include, but not limited to, polypropylene, polyethylene, polyethylene oxide, polyvinyl alcohol, polyvinylpyrrolidone, polyvinyl chloride, polyester, polycarbonate, alkyd resin, polyurethane, methyl methacrylate resin, cellulose and the like. Of these, the use of polyester thermoplastic resin is particularly preferable in view of adhesion to the substrate, water resistance, weatherability and the like.

In the present invention, the water non-absorptive resin means a resin that does not absorb water at normal temperature in a proportion of not less than 10%, more preferably not less than 5%, of the solid resin. The water absorption is evaluated based on variation in the volume of the resin solid before and after immersion in water at normal temperature for 24 hours. To be specific, the resin is applied on a substantially water non-absorptive support, such as aluminum foil, glass and the like, in a thickness of several dozen μm, dried, immersed in ion exchange water at 18° C. for 24 hours, and measured for the thickness.

A particularly beneficial binding material in the present invention is a polyester resin emulsifiable or dispersible in water, which is obtained from dibasic acid and glycol. Specific examples include a polyester copolymer obtained by copolymerization of at least two kinds of dicarboxylic acid components and a glycol component, which comprises a dibasic acid comprising sulfonic acid metal base-containing dicarboxylic acid in a proportion of 50–0.5 mol % of the entire dicarboxylic acid.

The above-mentioned sulfonic acid metal base-containing dicarboxylic acid is exemplified by metal salts of sulfoterephthalic acid, 5-sulfoisophthalic acid, 4-sulfophthalic acid, 4-sulfonaphthalene-2,7-dicarboxylic acid, 5[4-sulfophenoxy]isophthalic acid and the like, with particular preference given to sodium 5-sulfoisophthalate and sodium sulfoterephthalate. The sulfonic acid metal base-containing dicarboxylic acid is contained in a proportion of 50–0.5 mol %, preferably 20–1 mol %, of the entire dicarboxylic acid component. When it exceeds 50 mol %, dispersibility in water may be improved, but water resistance of the copolymer decreases. The dispersibility of the polyester copolymer in water varies depending on copolymerization composition, the kind and amount of the water soluble organic compound and the like. The amount of the above-mentioned sulfonic acid metal base-containing dicarboxylic acid is preferably smaller as long as the dispersibility in water is not impaired.

As the dicarboxylic acid without sulfonic acid metal base, aromatic dicarboxylic acid, aliphatic dicarboxylic acid and alicyclic dicarboxylic acid are used. Examples of the aromatic dicarboxylic acid include terephthalic acid, isophthalic acid, orthophthalic acid, 2,6-naphthalenedicarboxylic acid and the like. The aromatic dicarboxylic acid is preferably contained in a proportion of not less than 40 mol % of the entire dicarboxylic acid component. When it is less than 40 mol %, mechanical strength and water resistance of the polyester copolymer decrease. Examples of the aliphatic and alicyclic dicarboxylic acids include succinic acid, adipic acid, sebacic acid, 1,3-cyclopentanedicarboxylic acid, 1,2-cyclohexanedicarboxylic acid, 1,3-cyclohexanedicarboxylic acid, 1,4-cyclohexanedicarboxylic acid and the like. The addition of non-aromatic dicarboxylic acid component may result in higher adhesiveness, but generally degrades strength and water resistance of polyester copolymers.

The glycol component to be reacted with the above-mentioned dicarboxylic acid component may be an aliphatic glycol having 2 to 8 carbon atoms, an alicyclic glycol having 6 to 12 carbon atoms or a mixture of the two, with or without polyether glycol compound as necessary.

Examples of the aliphatic glycol having 2 to 8 carbon atoms and alicyclic glycol having 6 to 12 carbon atoms include ethylene glycol, 1,2-propylene glycol, 1,3-propanediol, 1,3-butanediol, neopentyl glycol, 1,6-hexanediol, 1,2-cyclohexanedimethanol, 1,4-cyclohexanedimethanol, p-xylylene glycol and the like. The aliphatic diol having 4 or more carbon atoms may be diethylene glycol, triethylene glycol and the like.

Examples of the polyether glycol include polyoxyethylene glycol, polyoxypropylene glycol, polyoxytetramethylene glycol and the like.

The polyester thermoplastic resin can be obtained by known melt condensation polymerization. That is, a direct esterification method wherein the aforementioned dicarboxylic acid component and the glycol component are directly reacted, water is evaporated, and the residue is esterified and subjected to condensation polymerization, or an ester exchange method where dimethyl ester in the dicarboxylic acid component is reacted with glycol component, methyl alcohol is evaporated, and the residue is subjected to ester exchange and condensation polymerization is employed. Alternatively, solution condensation polymerization, interface condensation polymerization and the like can give the polymer. In the present invention, the method is not limited to those exemplified. For melt condensation polymerization, antioxidant, slip agent, inorganic fine particles and antistatic can be added as necessary. The aforementioned polyether glycol such as polyoxyethylene glycol and the like can be melt-blended for copolymerization during melt condensation polymerization or after polymerization.

A resin is added to a coating solution for forming an ink receiving layer by adding the resin to an organic solvent or dispersing the resin in water. The resin can be dissolved in an organic solvent by adding the resin to lycol, glycol ether, ketone, aliphatic hydrocarbon or aromatic hydrocarbon organic solvent and heating the mixture. When it is dispersed or emulsified in water, the resin, a solvent that dissolves the resin and water are stirred with heating, or the resin is dissolved in an organic solvent with heating and then water is added to allow dispersing.

The above-mentioned polyester resin can be obtained from the market. For example, Vylonal manufactured by Toyo Boseki Kabushiki Kaisha, FINETEX manufactured By DAINIPPON INK AND CHEMICALS, INC. and the like can be used.

The ratio of the particles to the thermoplastic resin is not particularly limited. Preferably, the weight ratio of resin/particles is 1/1.2–1/10, more preferably 1/1.3–1/2.5. When the ratio of the particles to the resin is small, a higher proportion of the particles is covered with the thermoplastic resin, thus making the porous structure difficult to be formed. When the ratio of the particles becomes greater, the surface strength of the porous layer having a thickness of 40–105 $\mu$m in the present invention is degraded.

As used in the present invention, being porous means that a number of through holes are contained inside as well as from the surface to the inside.

The ink receiving layer can contain a surfactant for an improved leveling on coating, defoaming of coating solution and the like. The surfactant may be cationic, anionic, nonionic or amphoteric. Preferably, it is a silicone or fluorine surfactant. Examples of the silicon surfactant include dimethyl silicon, amino silane, acrylic silane, vinyl benzyl silane, vinyl benzyl aminosilane, glycidesilane, mercaptosilane, dimethylsilane, polydimethylsiloxane, polyalkoxysiloxane, siloxane modified with hydrodiene (i.e., hydrodiene-modified siloxane), vinyl-modified siloxane, hydroxy-modified siloxane, amino-modified siloxane, carboxy-modified siloxane, halogenated siloxane, epoxy-modified siloxane, methacryloxy-modified siloxane, mercapto-modified siloxane, fluorine-modified siloxane, alkyl-modified siloxane, phenyl-modified siloxane, alkylene oxide-modified siloxane and the like. Examples of the fluoro surfactant include perfluoroalkyl ammonium salt, perfluoroalkyl sulfonamide, sodium perfluoroalkyl sulfonate, perfluoroalkyl potassium salt, perfluoroalkyl carboxylate, perfluoroalkyl sulfonate, perfluoroalkyl ethylene oxide adduct, perfluoroalkyl trimethyl ammonium salt, perfluoroalkyl aminosulfonate, perfluoroalkyl phosphate, perfluoroalkyl alkyl compound, perfluoroalkyl alkyl betaine, perfluoroalkyl halide and the like. The surfactant is preferably added in an amount that does not cause drastic degradation of ink absorption by the ink receiving layer.

In the context of the present invention, the ink receiving layer is preferably formed by preparing a coating solution by emulsifying or dispersing the above-mentioned particles and the above-mentioned water non-absorptive thermoplastic resin having a glass transition temperature (Tg) of not less than −5° C. and not more than 100° C. in an aqueous solvent, applying the solution to at least one side of the above-mentioned translucent substrate, and evaporating the solvent by drying. The above-mentioned coating solution preferably contains the water soluble solvent having a high boiling point of not less than 150° C. in a proportion satisfying the following formulas 1 and 2:

$$S \geqq Tg-30 \quad 1$$

$$S \leqq Tg+70 \quad 2$$

wherein S is a proportion [parts by weight] of a water soluble solvent having a boiling point of not less than 150° C. to a thermoplastic resin (100 parts by weight), and Tg is a glass transition temperature [°C.] of the thermoplastic resin.

By the “water soluble high boiling point solvent” is meant a solvent having a boiling point of not less than 150° C. and being capable of dissolving in water at an optional ratio.

When the boiling point of the water soluble high boiling point solvent is less than 150° C., it evaporates with other solvent during the drying step for forming an ink receiving layer, possibly resulting in a failure to show full effect of the present invention.

The weight ratio (A/B) of the particles to the resin and the relationship with Tg of the thermoplastic resin are preferably expressed by the following formulas.

$$A/B \geqq 1.2$$

$$A/B \geqq Tg/100+0.8$$

$$A/B \leqq Tg/100+7.0$$

When the weight ratio of the particles to the resin is smaller than 1.2, a greater amount of the resin covers the surface of the particles, thereby making ink absorption inferior due to the less amount of the particles present in the porous ink receiving layer. For use in a printer with greater ink discharge, the formula $A/B \leqq Tg/100+1.9$ is preferably satisfied.

When the glass transition temperature of the thermoplastic resin is high, thermoplastic resin has lower fluidity in a drying step during forming the ink receiving layer, which means that the film forming property in the drying step becomes high. As a result, the amount of the resin that covers the particles on the surface of the ink receiving layer, and the amount of ink absorption on the surface may decrease. When the amount of ink absorption on the surface decreases, the permeation of the ink in the thickness direction becomes noticeable and the recorded images may sink. When the thermoplastic resin has a high glass transition temperature, therefore, the above-mentioned high boiling point solvent is added in a greater amount, thereby to adjust melt viscosity at dry temperature during forming an ink receiving layer.

When the thermoplastic resin has a low glass transition temperature, its fluidity in the drying step becomes high, and the amount of the resin that covers the particles on the surface of the ink receiving layer becomes less, thus increasing the amount of ink absorption on the surface. When the temperature is still lower, the surface strength may drop. When the amount of ink absorption on the surface is too high, recorded images having high image density can be easily produced by absorption of the ink on the surface. However, when the dot diameter gets smaller than a designed value, gaps may appear between dots when black solid print is yielded. When the glass transition temperature of the thermoplastic resin is low, therefore, the above-mentioned high boiling point solvent is added in less amounts, thereby making higher the melt viscosity at dry temperature during forming an ink receiving layer.

In the present invention, a thermoplastic resin is emulsified or dispersed in a solvent mainly consisting of water for forming an ink receiving layer by, for example, a method wherein the thermoplastic resin and the above-mentioned water soluble high boiling point solvent and the mixture is continued to be stirred with heating, a method wherein a thermoplastic resin is dissolved in a water soluble high boiling point solvent with heating and a solvent is added to allow dispersion and the like.

According to the present invention, the above-mentioned water soluble solvent having a boiling point of not less than 150° C. is exemplified by glycol, glycol ether, glycol ester solvents and the like. Specific examples include ethylene glycol, diethylene glycol, propylene glycol, triethylene glycol, polyethylene glycol, ethylene glycol monobutyl ether, diethylene glycol monomethyl ether, diethylene glycol monoethyl ether, diethylene glycol monobutyl ether, diethylene glycol monomethyl acetate, diethylene glycol monoethyl acetate, triethylene glycol monomethyl ether, triethylene glycol monoethyl ether, triethylene glycol monobutyl ether, 2-methyl-1,3-propanediol, N-methyl-2-pyrrolidone and the like. These may be used alone or in combination.

When forming the above-mentioned ink receiving layer, a coating solution is obtained by dissolving and dispersing the constituent components of the particles and thermoplastic resin and the like constituting the ink receiving layer and is applied to the surface of the substrate by any method which is free of any particular limitation. For example, gravure coat method, kiss coat method, dipping method, spray coat method, curtain coat method, air knife coat method, blade coat method, reverse roll coat method, bar coat method, lip coat method and the like can be employed, which are conventional methods.

The above-mentioned ink receiving layer has a thickness free of particular limitation. When it is used as an illumination signboard, the recording material preferably has a total light transmittance (measured according to JIS K 7105) of 15–60%. When the total light transmittance exceeds 60%, the degree of non-transparency becomes insufficient. This may cause insufficient color development when used as an illumination signboard. When the total light transmittance is less than 15%, the material is not translucent enough, and the unprinted portion becomes dark, thus failing to provide vivid images when used as an illumination signboard. When the ink receiving layer has too small a thickness, the amount of ink absorption may become insufficient. The amount of the coating solution to be applied to the substrate surface can be determined appropriately according to the kind and proportion of the constituent components, solvent and the like. It is preferably from 5 $g/m^2$ to 100 $g/m^2$. The total thickness of the recording material of the present invention is also free of any particular limitation as long as it does not inhibit the effect of the present invention.

When the ink receiving layer is formed on one side of the substrate, the substrate surface opposite from the ink receiving layer may be subjected to various processing steps as necessary. As such processing, for example, antistatic layer, adhesive layer, writing layer and the like may be formed.

In view of the constitution of the aforementioned ink receiving layer, the recording material of the present invention can be beneficially used for image forming by the ink jet recording method, particularly the ink jet recording method using oily ink. The recording material of the present invention after image forming can be beneficially used for illumination signboard wherein light is cast from the side without images for appreciation from the image side.

It is also possible to add, as a binding resin for the ink receiving layer, a water soluble or water swellable resin in a small amount. It is preferably added in such an amount that does not absorb water in less than 10% of the resin solid at normal temperature. When the resin absorbs water in an amount of not less than 10%, the curl value, strength of the water resistant surface and the like of the present invention may not be achieved.

The amount to be added of the water soluble or water swellable resin is preferably not more than 15 wt %, more preferably not more than 10 wt %, particularly preferably not more than 5 wt %. Most preferably, the amount thereof does not exceed the small amount to be added as a viscosity adjusting agent and the like.

The ink receiving layer may contain various additives as long as they do not impair ink absorption capability and other properties. For example, fluorescent dye, fluorescent whitening dye, plasticizer, ultraviolet absorber, pigment dispersing agent, anti-foaming agent, defoaming agent, preservative and the like can be added.

The ink receiving layer may contain various crosslinking agents as long as they do not prevent the object of the present invention. Examples of the crosslinking agent include urea, epoxy, melamine, isocyanate crosslinking agents and the like.

The ink receiving layer can be formed by any method that is not particularly limited. For example, gravure coat method, kiss coat method, dip method, spray coat method, curtain coat method, air knife coat method, blade coat method, reverse roll coat method, lip coat method and the like can be applied, which are conventional methods.

The surface opposite from the ink receiving layer may be subjected to various processing steps as necessary. As such processing, for example, antistatic layer, adhesive layer, writing layer and the like may be formed.

Ink

The oily ink to be used for the recording material of the present invention may be any ink. A dye or pigment is dissolved or dispersed in a solvent and can be used beneficially as the ink.

The dye to be used for oily ink may be, for example, oil soluble dye such as naphthol dye, azo dye, metal complex salt dye, cyanine dye, quinoline dye, nitro dye, anthraquinone dye, quinoneimine dye, indigo dye, nitroso dye, benzoquinone dye, carbonium dye, naphthoquinone dye, naphthalimide dye, phthalocyanine dye, Perylene dye and the like.

The pigment to be used for the oily ink may be, for example, an inorganic pigment such as aluminum powder, bronze powder, carbon black, titanium oxide, iron oxide, zinc white, alumina white, red iron oxide, barium sulfate, calcium carbonate, magnesium carbonate, clay, ultramarine, chrome yellow, cobalt blue, ultramarine and the like; fast yellow G, fast yellow 10G, disazo yellow AAA, disazo yellow AAMX, disazo yellow AAOT, disazo yellow AAOA, o-nitroaniline orange, dinitroaniline orange, disazo orange, disazo orange PMP, toluidine red, chlorinated p-red, naphthol red M, briliant fast scarlet, naphthol red 23, pyrazolone red, barium red 2B, calcium red 2B, strontium red 2B, manganese red 2B, lake red C, rhodamine 6G lake, eosin lake, naphthol red FGR, rhodamine B lake, methyl violet lake, quinacridone red k, dioxazine violet, basic blue 5B lake, basic blue 6G lake, phthalocyanine blue, fast sky blue, alkali blue G toner, alkali blue R toner, peakock blue lake, briliant green lake, diamond green thioflavine lake, phthalocyanine green G, green gold, phthalocyanine green Y, aniline black, daylight fluorescent pigment, pearl pigment and the like.

The solvent to be used for oily ink includes various solvents that are determined from the aspects of adaptability to the characteristics of head nozzle, safety and drying property. Where necessary, plural solvents are mixed for use. Examples of the solvent include aliphatic hydrocarbon such as n-hexane, n-heptane, rubber volatile oil, mineral spirits and the like; aromatic hydrocarbon such as toluene, xylene, sorbent naphtha No. 1, sorbent naphtha No. 2, sorbent naphtha No. 3, Exxsol D30, Exxsol D40, Exxsol D80, tetraline and the like; alcohol such as methyl alcohol, ethyl alcohol, n-propyl alcohol, isopropyl alcohol, n-butyl alcohol, tridecyl alcohol, cyclohexyl alcohol, 2-methylcyclohexyl alcohol and the like; glycol or polyol such as ethylene glycol, diethylene glycol, triethylene glycol, polyethylene glycol, propylene glycol, dipropylene glycol, glycerol and the like; glycol ether and glycol monoesters such as ethylene glycol monomethyl ether, ethylene glycol monoethylene ether, ethylene glycol monobutyl ether, diethylene glycol monomethyl ether, diethylene glycol monoethyl ether, diethylene glycol butyl ether, ethylene glycol monomethyl ether acetate, ethylene glycol monoethyl acetate, ethylene glycol monobutyl acetate, diethylene glycol monomethyl acetate, diethylene glycol monoethyl acetate, diethylene glycol monobutyl acetate and the like, esters such as ethyl acetate, isopropylene acetate, n-butyl acetate and the like, ketones such as acetone, methyl ethyl ketone, methyl isobutyl ketone, cyclohexanone, isophorone, diacetone alcohol and the like.

The oily ink may contain additives to increase storage stability, such as resistance to friction and the like; for example, a resin such as polyacrylic ester, linseed oil-modified alkyd resin, polystyrene, rosin resin, terpene phenol resin, alkylphenol modified xylene resin and the like, plasticizer, wax, drier, dispersing agent, tackifier, gelling agent, thixotropy-imparting agent, defoaming agent, antifoam, sedimentation inhibitor, dry inhibitor, antioxidant, smoothing agent, fungicide, ultraviolet absorber, delustering agent, antistatic, stabilizer, flame retarder, surface tension adjusting agent, surfactant, viscosity adjusting agent and the like can be added.

The thus-obtained recording material affords sharp recording without bleeding by the ink jet recording method particularly using oily ink, wherein the images show superior water resistance. The recording material of the present invention comprises a porous ink receiving layer, and can be used as a recording material for aqueous ink.

According to the present invention, aqueous ink may be used for printing. In this case, the ink receiving layer is more preferably used as an absorption layer in combination with an ink passage layer that quickly leads the ink to the ink receiving layer. The ink absorption layer, preferably an ink passage layer, preferably has a surface strength of not less than 80 g weight/cm, more preferably not less than 100 g weight/cm, still more preferably not less than 160 g weight/cm, and most preferably not less than 200 g weight/cm. The upper limit is not particularly set, but it equals the adhesion between the substrate and the ink absorptive layer (ca. 3000 g/cm).

As used herein, the surface strength was measured by adhering a vinyl chloride laminate film (manufactured by LINTEC CORPORATION P307-RC) cut in 25 mm width× 150 mm length to the surface of the ink absorption layer, peeling off the laminate film by pulling with a film tensile test machine (tensilon) at a rate of 200 mm/min, and measuring the maximum stress, wherein the laminate film was peeled off at 180°.

When the surface strength is less than 80 g weight/cm, a laminate film (laminated after printing) may be stripped due to a small impact during transport, or may be easily come off when adhered using a both side adhesive, affording poor workability. The surface strength can be made to not less than 80 g weight/cm by the following method, though the range therefor cannot be easily set because, in the ink absorption layer, particularly ink passage layer, the kind of resin, particles, surfactant and the like, ratios of addition thereof, thickness of the layer, particle size and the like are complicatedly connected.

In the present invention, the substrate is not particularly limited as long as it passes light, but it preferably has a light transmission of not less than 80%. For example, plastic films such as polyester film, polystyrene film, polypropylene film, acrylic film and the like, glass and a laminate of two or more kinds therefrom can be used.

According to the present invention, an ink absorption layer is formed on this substrate to give a recording material.

While the ink absorption layer may be a monolayer, it desirably consists of at least two layers of an ink receiving layer and an ink passage layer.

The ink receiving layer is not particularly limited as long as it absorbs ink, wherein the mechanism of absorption may be due to the use of an ink-receptive resin, or capillarity.

When an ink-receptive resin is used as the main component, a known ink absorptive resin can be used. For example, a resin such as polyvinyl alcohol, acrylic resin, styrene-acryl polymer, ethylene-vinyl acetate polymer, starch, polyvinylbutyral, gelatin, casein, ionomer, gum arabic, carboxymethylcellulose, polyvinylpyrrolidone, polyacrylamide, polyester resin, styrene-butadiene rubber and the like or one or more modified resins thereof can be used, with preference given to polyvinyl alcohol. Known treatment for improving water resistance can be applied as necessary.

When pigment ink is used, a porous layer is beneficially formed to achieve ink absorption by capillarity, thereby to ensure superior color development and fixation. In this case, the ink absorption layer consists of particles and a binder. Examples of the particles include silica, kaolinite, talc, calcium carbonate, zeolite, alumina, barium sulfate, carbon black, zinc oxide, titanium oxide, organic white pigment, benzoguanamine particles, crosslinked polystyrene, crosslinked acryl particles, aluminum hydroxide and the like. Of these, silica, calcium carbonate, aluminum hydroxide and the like are preferably used, which have more number of hydrophilic group such as hydroxyl group and the like, with particular preference given to silica. The binder is free of particular limitation, but a resin such as polyvinyl alcohol, acrylic resin, styrene-acryl polymer, ethylene-vinyl acetate polymer, starch, polyvinylbutyral, gelatin, casein, ionomer, gum arabic, carboxymethylcellulose, polyvinylpyrrolidone, polyacrylamide, polyester resin, styrene-butadiene rubber and the like and one or more kinds of modified resins thereof can be used on demand. The volume ratio of the binder to the particles is preferably 1/1–1/10 in view of the relationship between ink absorption and layer strength.

To prevent blurring and transfer of dye due to moisture from humidity and the like, the ink absorptive resin preferably has a cationic group or anion group. When such group is void, an ionic resin or compound is preferably added. In this way, ink absorption can be enhanced and dye in the ink can be fixed in the ink receiving layer.

The ink receiving layer may contain a surfactant for improved leveling during coating, defoaming of coating solution, reduction of blurring and the like. The surfactant maybe cationic, anionic, nonionic or amphoteric. However, it is preferably a silicon or fluorine surfactant. Examples of the silicon surfactant include dimethyl silicon, amino silane, acrylic silane, vinyl benzylsilane, vinyl benzylaminosilane, glycidesilane, mercapto silane, dimethylsilane, polydimethylsiloxane, polyalkoxysiloxane, hydrodiene-modified siloxane, vinyl-modified siloxane, hydroxy-modified siloxane, amino-modified siloxane, carboxy-modified siloxane, halogenated siloxane, epoxy-modified siloxane, methacryloxy-modified siloxane, mercapto-modified siloxane, fluorine-modified siloxane, alkyl-modified siloxane, phenyl-modified siloxane, alkylene oxide-modified siloxane and the like. Examples of the fluorine surfactant include tetrafluoro ethylene, perfluoroalkyl ammonium salt, perfluoroalkylsulfonamide, sodium perfluoroalkylsulfonate, perfluoroalkyl potassium salt, perfluoroalkylcarboxylate, perfluoroalkylsulfonate, perfluoroalkylethylene oxide adduct, perfluoroalkyltrimethyl ammonium salt, perfluoroalkylaminosulfonate, perfluoroalkylphosphate, perfluoroalkyl alkyl compound, perfluoroalkyl alkylbetaine, perfluoroalkyl halide and the like. These surfactants are preferably added in an amount that does not induce drastic degradation of ink absorption capability of the ink receiving layer.

The ink receiving layer may contain various additives as long as they do not impair the ink absorption capability and other properties. For example, fluorescent dye, plasticizer, ultraviolet absorber and the like can be added.

The ink receiving layer can be formed by any method. For Example, gravure coat method, kiss coat method, dipping method, spray coat method, curtain coat method, air knife coat method, blade coat method, reverse roll coat method, bar coat method and the like can be employed, which are conventional methods.

The amount to be coated is not particularly limited, but it is preferably not less than 5 $g/m^2$ and not more than 50 $g/m^2$. When an ink passage layer and an ink receiving layer are to be formed, the amount to be added is preferably not less than 5 $g/m^2$, more preferably not less than 7 $g/m^2$ and not more than 25 $g/m^2$. An amount below this level results in difficulty in achieving the desired density of the print and when it is not less than 50 $g/m^2$, the surface strength decreases.

When adhesive power between a substrate and an ink absorption layer is insufficient, an anchor coat layer is preferably formed. The anchor coat layer is formed from a compound of polyester resin, polyurethane resin, polyester urethane resin, acrylic resin, melamine resin and the like, mixtures thereof and the like. The anchor coat layer can be formed by gravure coat method, kiss coat method, dipping method, spray coat method, curtain coat method, air knife coat method, blade coat method, reverse roll coat method and the like can be employed, which are conventional methods.

The ink passage layer needs to lead the ink toward the ink receiving layer. For this to be achieved, the passage layer should mainly consist of particles and a binder and needs to be porous.

Examples of the particles include particles of silica, kaolinite, talc, calcium carbonate, zeolite, alumina, barium sulfate, carbon black, zinc oxide, titanium oxide, organic white pigment, benzoguanamine particles, crosslinked polystyrene, crosslinked acryl particles, aluminum hydroxide and the like. Particles most suitable for improving the function such as passage of the ink, opacifying power, light dispersibility and the like should be selected. With regard to the passage of ink, the particles preferably do not adsorb water or dye in the ink into the surface, and organic particles having less hydrophilic groups such as hydroxyl group and the like on the surface are used. For desired opacifying power and light dispersion, and the light transmittance within a desired range to be achieved, the refractive index is preferably from 1.47 to 1.60.

The resin used to bind particles is preferably a resin sparingly soluble in water. For example, polyester resin, polyacrylic resin, polyurethane resin, various copolymers and the like can be used, with preference given to acrylic resin and acryl-styrene copolymer that absorb water in less amounts. When at least one kind of resin selected from isocyanate, melamine and epoxy resin is added, it acts as a crosslinking agent that improves the surface strength.

The layer preferably consists mainly of particles and a binder to connect particles. The ratio of the binder to the particles is preferably between 1/1 and 12/1, more preferably 4/1 and 10/1. When the amount of the particles is small, the gap between particles becomes smaller, making passage of the ink not smooth. When the amount of the particles is too large, the strength of the layer becomes low. The particle size also contributes to the passage of the ink. Too great a size results in blurring of ink and too small a size results in brittleness of the film. Preferable particle size is 1.0–5.0 $\mu$m.

In the present invention, the ink passage layer preferably contains a cationic resin. While the above-mentioned binder is desirably a cationic resin, when it is not, a cationic resin may be added.

The cationic resin is not particularly limited and a resin containing quaternary ammonium salt can be used.

When the amount of the cationic resin is large, the dye in the ink is fixed in the ink passage layer, reducing color density, and when it is too small, no effect is obtained. The effect varies depending on the strength of the ionicity of the resin, and the amount needs to be adjusted according to the property of the resin.

The ink passage layer preferably contains surfactant, wax and the like to control passage of the ink. Particularly, silicon surfactant and fluorine surfactant that reduce the surface tension of water are preferable. The surfactant can be present in the passage layer to reduce adhesion of the ink and can be dissolved in the ink to reduce tension of the ink surface. By this action, an influence on the ink absorption due to surface tension of the ink can be decreased. This in turn results in less blurring of the ink.

Examples of the silicon surfactant include dimethyl silicon, amino silane, acrylic silane, vinyl benzylsilane, vinyl benzylaminosilane, glycidesilane, mercapto silane, dimethylsilane, polydimethylsiloxane, polyalkoxysiloxane, hydrodiene modified siloxane, vinyl modified siloxane, hydroxy modified siloxane, amino modified siloxane, carboxyl modified siloxane, halogenated modified siloxane, epoxy modified siloxane, methacryloxy modified siloxane, mercapto modified siloxane, fluorine modified siloxane, alkyl modified siloxane, phenyl modified siloxane, alkylene oxide modified siloxane and the like. Examples of the fluorine surfactant include tetrafluoroethylene, perfluoroalkyl ammonium salt, perfluoroalkylsulfonamide, sodium perfluoroalkylsulfonate, potassium perfluoroalkylate, perfluoroalkylcarboxylate, perfluoroalkylsulfonate, perfluoroalkylethylene oxide adduct, perfluoroalkyltrimethyl ammonium salt, perfluoroalkylaminosulfonate, perfluoroalkylphosphate, perfluoroalkylalkyl compound, perfluoroalkylalkylbetaine, perfluoroalkyl halide and the like. While the content of the silicon surfactant varies depending on the kind thereof, it is preferably contained in a proportion of not less than 1 wt % and not more than 20 wt % of the solid content of the ink passage layer. When it is not more than 1 wt %, the effect is void, whereas when it is not less than 20 wt %, the strength of the ink passage layer may decrease.

The ink passage layer may be formed by any method. For example, gravure coat method, kiss coat method, dipping method, spray coat method, curtain coat method, air knife coat method, blade coat method, reverse roll coat method, bar coat method and the like can be employed, which are conventional methods.

In the present invention, the recording material preferably has a light transmittance of not less than 25% and not more than 40%, more preferably not less than 30% and not more than 39%. The light transmittance within this range makes the printed material highly vivid when used as a recording material for illumination.

According to the present invention, the ink passage layer preferably has a density of not less than 0.5 $g/m^2$ and not more than 0.95 g/m$^2$, more preferably not less than 0.7 g/m$^2$ and not more than 0.9 g/m$^2$. When it is less than 0.5 g/m$^2$, the surface strength decreases. When it exceeds 0.95 g/m$^2$, the passage of ink becomes inferior, possibly degrading the quality of the printed material.

The printed material in the present invention preferably contains ink in an amount of not less than 10 g/m$^2$ and not more than 70 g/m$^2$, more preferably not less than 30 g/m$^2$ and not more than 65 g/m$^2$. An amount not more than this level results in failure to provide vividness of the printed material, and an amount not less than this level may result in greater degree of bleeding.

The recording material of the present invention has a color density upon transmission of the black solid print of preferably not less than 2.0, more preferably not less than 2.4, and color density upon reflection of not less than 1.3. Densities not more than these levels only afford printed materials with less vividness.

In the present invention, a recording material (not less than 5 m and not more than 100 m) is wound around a tube having an outer diameter of not less than 5 cm and not more than 10 cm, thereby to make its setting on the printer easy.

The side of the substrate where an ink absorptive layer is not formed can be subjected to various processing steps as long as they do not noticeably degrade the light transmittance. For example, a layer containing ultraviolet absorber and antistatic may be formed, a hard coat for preventing scratches may be formed or a gloss reduction treatment may be applied.

When using the recording material of the present invention, ink is injected, which is absorbed by the ink receiving layer and develops color. The recorded material is appreciated from the substrate side.

The ink to be used for the recording material of the present invention may be any anionic ink. The ink shows fine color development without the influence of surface tension or viscosity. The solvent in the ink preferably contains water as the main component.

The ink to be used may be ink (dye ink) that is obtained by dissolving a water soluble dye such as direct dye, acid dye, edible pigment and the like, or ink comprising pigment dispersed therein (pigment ink). When a recording material for outdoor signboard or for illumination is desired, pigment ink superior in weatherability is preferably used.

The recording material thus obtained affords high quality, high grade print with high gloss of the same level as silver salt photographs, and can be used for illumination.

The present invention is explained in detail by referring to illustrative examples. The present invention is not limited by these examples in any way. In the Examples, "part" or "%" mean "parts by weight" and "wt %" unless particularly specified.

EVALUATION METHODS

The recording materials prepared in the following Examples and Comparative Examples were evaluated by the following methods.

(1) (i) Grade of print—1 (Image Formed with Oily Ink)

Oil pigment ink for ink jet printer IJP-3600, manufactured by OLYMPUS OPTICAL COMPANY LIMITED, was injected toward a recording material using an ink jet printer for the piezo type on demand method, which had been adjusted to resolution 720 dpi, ink amount unicolor (black, cyanide, magenta, yellow) maximum about 24 ml/m$^2$ and secondary color (red, blue, green) maximum about 48 ml/m$^2$, with the recorded images being photographic images and illustration. The light was cast from the non-recorded surface of the recording material on a trace table made by KOKUYO CO., LTD. The recorded images and illustration were visually observed according to the following criteria.

◎: vivid and extremely superior color development
○: vivid and superior color development
Δ: no problem though slightly poor color development
X: darkish color or poor color development (ii) Grade of Print—2

In the same manner as in the above-mentioned test method (i) except that the amount of discharged ink was set to ½ of the "grade of print—1", and the resolution was set to 360 dpi, the measurement was carried out.

(iii) Grade of Print—3 (Image Formed with Aqueous Pigment Ink)

Carried out in the same manner as in the above-mentioned test method (i) using JV2-130, manufactured by MIMAKI Engineering CO., LTD., and its pure ink, with the recorded images being photographic images and illustration. The light was shot from the non-recorded surface of the recording material on a trace table made by KOKUYO CO., LTD. The recorded images and illustration were visually observed according to the following criteria.

◎: vivid and extremely superior color development
○: vivid and superior color development
Δ: no problem though slightly poor color development
X: darkish color or poor color development (iv) Grade of Print—4 (Image Formed with Aqueous Dye Ink)

Carried out in the same manner as in the above-mentioned test method (i) using PM-700C, manufactured by EPSON, and its pure ink, with the recorded images being photographic images and illustration. The light was shot from the non-recorded surface of the recording material on a trace table made by KOKUYO CO., LTD. The recorded images were visually observed according to the following criteria.

◎: vivid and extremely superior color development
○: vivid and superior color development
Δ: no problem though slightly poor color development
X: darkish color or poor color development (v) Grade of Print—5

In the same manner as in the above-mentioned test method (i) using ink jet printer IJP-3600, manufactured by OLYMPUS OPTICAL COMPANY LIMITED, and its pure ink, the recorded images of photographic images and illustration were recorded at semi 720 dpi mode. The light was cast from the non-recorded surface of the recording material on a trace table made by KOKUYO CO., LTD. The recorded images and illustration were visually observed according to the following criteria.

◎: vivid and extremely superior color development
○: vivid and superior color development
Δ: no problem though slightly poor color development
X: darkish color or poor color development (vi) Grade of Print—6

In the same manner as in the above-mentioned test method (i) using ink jet printer IJP-3600, manufactured by OLYMPUS OPTICAL COMPANY LIMITED and its pure ink, the recorded images of photographic images and illustration were recorded at semi 720 dpi mode. The printed material was observed from the non-recorded surface without casting light on an illumination apparatus.

◎: vivid and extremely superior color development
○: vivid and superior color development
Δ: no problem though slightly poor color development
X: darkish color or poor color development (2) Thickness The thickness of the substrate and the thickness of the ink receiving layer were obtained according to the following formulas from the thickness of the recording material and the thickness after removal of the ink receiving layer.

(thickness of ink receiving layer)=[thickness of recording material]−[thickness after removal of ink receiving layer]

(thickness of substrate)=(thickness after removal of ink receiving layer)

(3) Curl Value

Two sheets (20 cm×20 cm) of recording material evaluation samples were cut out and set on a mat board with the ink receiving layer of one recording material facing upward and that of the other material facing downward. The materials were left standing for 24 hours at 20° C./60% RH, and the maximum height of the corner of the materials was measured as the curl value before treatment. When the curling occurred with the ink receiving layer inwardly bent, the measure was a "+value", and when the curling occurred with the ink receiving layer outwardly bent, the measure was a "−value". The curl values at 15° C./20% RH and 30° C./80% RH were measured in the same manner.

(4) Transportability

An ink jet printer IJ-3600, manufactured by OLYMPUS OPTICAL COMPANY LIMITED, and 914 mm width ×30 m wound recording material were left standing for 24 hours in an environment of 15° C./20% RH, 20° C./60% RH and 30° C./80% RH, and black solid paint was printed on the entire roll of 30 m. When the printing was free of any problem, it was evaluated as ○, and when the head scratched the recording material or the recording material clogged, it was evaluated as X.

(5) Cutting Property

The recording material was cut with a cutter. When powder did not fall, the material was evaluated as ○, when powder fell somewhat, the material was evaluated as Δ, and when powder fell in a great amount, the material was evaluated as X.

(6) Total Light Transmittance of Substrate

The total light transmittance of the substrate used for the recording material was measured according to JIS K-7105.

(7) Total Light Transmittance of Recording Material

The total light transmittance of the recording material was measured according to JIS K-7105.

(8) Water Resistance of Recording Material

A recording material was immersed in water at 23° C. for 24 hours, rubbed several times with a finger, dried naturally at 23° C. for 24 hours and visually compared with a material without immersion in water according to the following criteria.

○: no difference
Δ: somewhat different but not of problematic level
X: apparently different (9) Surface Strength of Recording Material (Ink Receiving Layer)

A cellophane tape manufactured by NICHIBAN COMPANY, LIMITED was adhered to the surface of the ink receiving layer of a recording material and left standing at 23° C. for 1 hour. The tape was gently peeled off and the tape was visually observed and evaluated according to the following criteria.

○: no adhesion of ink receiving layer of recording material to cellophane tape
Δ: slight adhesion of ink receiving layer to cellophane tape
X: adhesion of ink receiving layer to the entire surface of cellophane tape

(10) Glass Transition Temperature (Tg) of Thermoplastic Resin Used for Ink Receiving Layer Using a differential scanning type calorimeter (manufactured by PERKIN-ELMER INC., DSC2 type), thermoplastic resin (5 mg) used for the recording material was dissolved and rapidly cooled. The temperature was raised from room temperature at 20° C./min and the glass transition temperature (Tg) was measured.

(11) Color Density Upon Transmission

Using an ink jet printer IJP-3600, manufactured by OLYMPUS OPTICAL COMPANY LIMITED, and pure oily pigment ink, a black solid print (K 100%) was made at semi 720 dpi mode, dried naturally for 24 hours and the color density upon transmission of light through the black solid print was measured using Macbeth densitometer TR-927.

(12) Color Density Upon Reflection

Using an ink jet printer IJP-3600, manufactured by OLYMPUS OPTICAL COMPANY LIMITED, and pure oily pigment ink, a black solid print (K 100%) was made at semi 720 dpi mode, dried naturally for 24 hours and the color density upon reflection of light on the black solid print was measured using Macbeth densitometer TR-927.

(13) Color Density Retention Proportion

Using an ink jet printer manufactured by OLYMPUS OPTICAL COMPANY LIMITED and pure ink, a black solid print was made, left standing at 20° C., humidity 60% to let it dry naturally for 24 hours, and the color density of the recording material was measured. Then, the recording material was cut out in 50 mm×150 mm and immersed in water for one hour. Using a friction tester II as defined in JIS L-0849, reciprocation test including 50 times of reciprocation was conducted. The mass of the load was 200 g, moved distance was 100 mm, moving speed was 30 reciprocations per minute, gauze for friction was Japan. Pharmacopoeia type I (2 sheets superimposed). After the fiction test, the material was washed lightly with flowing water and again dried in a drier at 160° C. for 3 minutes and subjected to measurement of color density. The color density retention proportion was calculated from the following formula color density retention proportion (%)=[(color density after test)/(color density before test)]×100

(14) Amount Coated

A recording material was cut out in 20 cm×20 cm and the ink receiving layer was removed with a solvent. The difference in weight before and after the removal was taken as the amount of coating on the ink receiving layer, unit=g/$m^2$.

(15) Outdoor Exhibition

The recorded material obtained in the above-mentioned (1) was, exhibited outdoor for one week (2 rainy days). The difference in images and illustration was visually evaluated. The evaluation criteria were: no change ○, change observed but no practical effect Δ, change made the image impractical X.

EXAMPLE 1

Preparation of Transparent Substrate

A polyethylene terephthalate resin (PET) having a specific viscosity of 0.62 was cast into a twin screw extruder and melt extruded from T-die at 290° C. The resin was statically adhered to a cooling rotary roll for setting, whereby an unstretched PET sheet was obtained. This unstretched sheet was heated to 90° C. (Tg+15° C.) with a roll stretching machine and longitudinally stretched 3.5 times. The sheet was heated to 140° C. on a tenter and transversely stretched 3.7 times. The film was heat treated at 235° C. while relaxing by 4% to give a film. The obtained film was a polyester resin film having a thickness of 100 μm and total light transmittance of 90%.

Preparation of Particle Dispersion and Dilute Surfactant

Water was added to particles (SYLYSIA 450, manufactured by Fuji Silysia Chemical LTD.) to a solid concentration of 20 wt % and the particles were dispersed in a homogenizer for 30 min at 5000 rpm to give a particle dispersion A. A surfactant (MEGAFAC F-144D, manufactured by DAINIPPON INK AND CHEMICALS, INC.) was dissolved in the same amount of isopropyl alcohol, and diluted 5-fold with water to give a dilute surfactant B having a solid concentration of 10 wt %.

in the above-mentioned [preparation of substrate], by microgravure printing, and dried by passing the substrate through a drying zone at 100° C., air amount 10 m/sec for 20 seconds, and then through a drying zone at 160° C., air amount 20 m/sec for 40 seconds to give a recording material. The ink receiving layer had a thickness of 55 μm.

EXAMPLES 2–11

In the same manner as in Example 1 except that the thickness of the substrate and the thickness of the ink receiving layer were as shown in Table 1, a recording material was obtained.

Comparative Examples 1–3

In the same manner as in Example 1 except that the resin was partially hydrolyzed polyvinyl alcohol (PVA-217, manufactured by KURARAY CO., LTD.) and the thickness of the substrate and the thickness of the ink receiving layer were as shown in Table 1, a recording material was obtained.

The results are shown in Table 1.

TABLE 1

| | Thickness (μm) of substrate | Thickness (μm) of ink receiving layer | Curl value (mm) 15° C., 20% | Curl value (mm) 20° C., 60% | Curl value (mm) 30° C., 80% | Transportability 15° C., 20% | Transportability 20° C., 60% | Transportability 30° C., 80% | Printing property Grade of print 1 | Printing property Grade of print 2 | Printing property Cutting property |
|---|---|---|---|---|---|---|---|---|---|---|---|
| Example 1 | 100 | 55 | −2 | −2 | −2 | ○ | ○ | ○ | ○ | ○ | ○ |
| Example 2 | 100 | 75 | −2 | −2 | −3 | ○ | ○ | ○ | ○ | ○ | ○ |
| Example 3 | 100 | 100 | −2 | −2 | −4 | ○ | ○ | ○ | ○ | ○ | ○ |
| Example 4 | 50 | 55 | −2 | −2 | −4 | ○ | ○ | ○ | ○ | ○ | ○ |
| Example 5 | 50 | 60 | −1 | −2 | −4 | ○ | ○ | ○ | ○ | ○ | ○ |
| Example 6 | 50 | 100 | 2 | 0 | 0 | ○ | ○ | ○ | ○ | ○ | ○ |
| Example 7 | 188 | 55 | 0 | 0 | −1 | ○ | ○ | ○ | ○ | ○ | ○ |
| Example 8 | 188 | 85 | −1 | 0 | −1 | ○ | ○ | ○ | ○ | ○ | ○ |
| Example 9 | 188 | 100 | −1 | −1 | −6 | ○ | ○ | ○ | ○ | ○ | ○ |
| Example 10 | 100 | 45 | −2 | −2 | −2 | ○ | ○ | ○ | ○ | ○ | ○ |
| Example 11 | 100 | 40 | −2 | −2 | −2 | ○ | ○ | ○ | ○ | ○ | ○ |
| Comp. Example 1 | 100 | 80 | +90 | −21 | −120 | × | × | × | ○ | ○ | ○ |
| Comp. Example 2 | 100 | 20 | +15 | −2 | −13 | ○ | ○ | ○ | × | × | ○ |
| Comp. Example 3 | 225 | 80 | +18 | −7 | +16 | × | × | × | ○ | ○ | ○ |

Preparation of Coating Solution Starting Materials and Mixing Weight Ratio

| | |
|---|---|
| ion exchange water | 3.73 parts |
| particle dispersion A | 68.78 parts |
| thermoplastic resin (Toyo Boseki Kabushiki Kaisha, Vilonal MD1100, solid concentration 30%) | 26.97 parts |
| fluorescent whitening dye (Uvitex EBF 250%, manufactured by Ciba Specialty Chemicals K.K.) | 0.11 part |
| dilute surfactant B | 0.41 part |

The above materials were mixed and stirred to give a coating solution.

Preparation of Recording Material

The above-mentioned coating solution was applied to the substrate having a thickness of 100 μm, which was obtained

EXAMPLE 12

Preparation of Transparent Substrate

In the same manner as in Example 1, a transparent substrate was produced.

Production of Thermoplastic Resin for Ink Receiving Layer

In an autoclave equipped with a thermometer and a stirrer were charged terephthalic acid (35 parts by weight), isophthalic acid (35 parts by weight), sodium 5-sulfoisophthalic acid (9 parts by weight), ethylene glycol (27 parts by weight), neopentyl glycol (46 parts by weight) and tetrabutoxytitanate (0.1 part by weight), and the mixture was heated from 180° C. to 230° C. for 120 minutes to conduct ester exchange. The reaction system was heated to 250° C. and the reaction was continued for 60 min under the pressure of the system of 1–10 mmHg. The reaction was continued for 60 min to give a copolymerized polyester resin (A1). The obtained copolymerized polyester resin (A1) had, as shown in Table 2, a reduced viscosity of 0.40 dl/g, a glass transition temperature of 61° C., and the composition by NMR analysis comprised of terephthalic acid (47.0 mol %), isophthalic acid (46.0 mol %) and sodium 5-sulfoisophthalic acid (7.0 mol %) as an acid component and ethylene glycol (50.0 mol %) and neopentyl glycol (50. 0 mol %) as a diol component. In the same manner as above, the copolymerized polyester resins (A2–A4) as shown in Table 2 were produced.

TABLE 2

| | A1 | A2 | A3 | A4 |
|---|---|---|---|---|
| terephthalic acid | 47 | 49 | 50 | 97.5 |
| isophthalic acid | 46 | 48.5 | 47.5 | |
| 5-sulfophthalic acid | 7 | 2.5 | 2.5 | 2.5 |
| ethylene glycol | 50 | 40 | | 20 |
| Neopentyl glycol | 50 | | | |
| Diethylene glycol | | 60 | 30 | |
| Hexanediol (HD) | | | 70 | |
| Propylene glycol | | | | 78 |
| Glass transition temperature (° C.) | 61 | 42 | 5 | 79 |
| reduced viscosity (dl/g) | 0.40 | 0.78 | 0.66 | 0.34 |

The swellability of (A1)–(A4) with water was not more than 1%.

Preparation of Aqueous Dispersion of Thermoplastic Resin for Ink Receiving Layer Ethylene glycol monobutyl ether (50 parts by weight, boiling point 171° C.) was added to copolymerized polyester resin (A1) (100 parts by weight) as shown in Table 2, and the mixture was heated to 130° C. for dissolution. The temperature was lowered to 80° C. and warm water was added with stirring to a solid concentration of 30% to give an aqueous dispersion (P1) of copolymerized polyester resin (A1). In the same manner as above, aqueous dispersions (P2–P14) of the copolymerized polyester resins (A1–A4) as shown in Table 3 were produced.

Preparation of Coating Solution for Forming Ink Receiving Layer

Water was added to particles (SYLYSIA 450, manufactured by Fuji Silysia Chemical LTD.) to a solid concentration of 20 wt % and the particles were dispersed in a homogenizer for 30 min at 5000 rpm to give a particle dispersion A. A surfactant (MEGAFAC F-142D, manufactured by DAINIPPON INK AND CHEMICALS, INC.) was dissolved in the same amount of isopropyl alcohol as the surfactant, and diluted 5-fold with water to give dilute surfactant B having a solid concentration of 10 wt %. This particle dispersion, dilute surfactant, aqueous dispersion of thermoplastic resin (A1) for the aforementioned ink receiving layer and a fluorescent whitening dye (UvitexEBF 250%, manufactured by Ciba Specialty Chemicals K.K.) were mixed in the following proportions to give a coating solution for forming an ink receiving layer.

| | |
|---|---|
| ion exchange water | 3.73 parts |
| particle dispersion | 68.78 parts |
| aqueous dispersion (P1) of thermoplastic resin (A1) for ink receiving layer | 26.97 parts |
| dilute surfactant | 0.41 part |
| fluorescent whitening dye | 0.11 part |

Forming of Ink Receiving Layer (Preparation of Recording Material)

The above-mentioned coating solution for forming an ink receiving layer was applied to the aforementioned substrate with a #60 wire bar,. and the substrate was heated in an oven maintained at 160° C. for 3 min. The solvent was removed by drying to give a recording material. This recording material had a total light transmittance of 30.3%.

EXAMPLES 13–24

Reference Example 1

In the same manner as in Example 12 except that the aqueous dispersion for thermoplastic resin for an ink receiving layer as shown in Table 4 was used,a recording material

TABLE 3

| Aqueous dispersion | Thermoplastic resin | Water soluble solvent: Ethylene glycol monobutyl ether (171° C.)** | Triethylene glycol monobutyl ether (271° C.)** | Diethylene glycol (245° C.)** | Ethylene glycol monomethyl ether (125° C.)** |
|---|---|---|---|---|---|
| P1 | A1 | 50* | 0 | 0 | 0 |
| P2 | A1 | 35* | 0 | 0 | 15* |
| P3 | A1 | 100* | 0 | 0 | 0 |
| P4 | A1 | 125* | 0 | 0 | 0 |
| P5 | A1 | 0 | 100* | 0 | 0 |
| P6 | A1 | 0 | 0 | 100* | 0 |
| P7 | A1 | 50* | 50* | 0 | 0 |
| P8 | A1 | 100* | 0 | 0 | 50* |
| P9 | A2 | 50* | 0 | 0 | 0 |
| P10 | A2 | 15* | 0 | 0 | 35* |
| P11 | A2 | 100* | 0 | 0 | 0 |
| P12 | A3 | 50* | 0 | 0 | 0 |
| P13 | A3 | 70* | 0 | 0 | 0 |
| P14 | A4 | 50* | 0 | 0 | 0 |

Note
*: parts by weight per 100 parts by weight thermoplastic resin
**: boiling point was obtained. The total light transmittance of the recording material was 30.2–41.1%.

EXAMPLES 25, 26

In the same manner as in Example 20 except that the coating solution for forming the ink receiving layer was applied with #30 and #75 wire bars, recording materials were obtained. These recording materials had a total light transmittance of 52.0% and 21.8%, respectively.

Comparative Example 4

In the same manner as in Example 12 except that the thermoplastic resin for forming the ink receiving layer was partially hydrolyzed vinyl alcohol (PVA-217, manufactured by KURARAY CO., LTD.), a recording material was obtained. This recording material had a total light transmittance of 34.5%.

The test results are shown in Table 4.

Preparation of Recording Material

The above-mentioned coating solution was applied to the above-mentioned substrate with a #60 wire bar, and the substrate was dried by maintaining the substrate at 160° C. for 3 minutes to give a recording material. The obtained recording material had a total light transmittance of 35.1%.

EXAMPLE 28

In the same manner as in Example 27, except that the solution was applied with a #30 bar, a recording material was obtained. The obtained recording material had a total light transmittance of 52.0%.

EXAMPLE 29

In the same manner as in Example 27, except that the solution was applied with a #75 bar, a recording material was obtained. The obtained recording material had a total light transmittance of 21.4%.

TABLE 4

| | Ink receiving layer | | | Test results | | | | |
|---|---|---|---|---|---|---|---|---|
| Ex. No. | Aqueous dispersion | Tg (° C.) | Amount (wt %) of solvent | Grade of print 1 | Grade of print 3 | Grade of print 4 | Surface strength | Water resistance |
| 12 | P1 | 61 | 50 | ○ | Δ | × | ○ | ○ |
| 13 | P2 | 61 | 35 | ○ | Δ | × | ○ | ○ |
| 14 | P3 | 61 | 100 | ◎ | Δ | × | ○ | ○ |
| 15 | P4 | 61 | 125 | ◎ | ○ | Δ | ○ | ○ |
| 16 | P5 | 61 | 100 | ◎ | Δ | × | ○ | ○ |
| 17 | P6 | 61 | 100 | ◎ | Δ | × | ○ | ○ |
| 18 | P7 | 61 | 100 | ◎ | Δ | × | ○ | ○ |
| 19 | P8 | 61 | 100 | ◎ | Δ | × | ○ | ○ |
| 20 | P9 | 42 | 50 | ◎ | ○ | Δ | ○ | ○ |
| 21 | P10 | 42 | 15 | ○ | ○ | Δ | ○ | ○ |
| 22 | P11 | 42 | 100 | ○ | ○ | Δ | ○ | ○ |
| 23 | P12 | 6 | 50 | ◎ | ○ | Δ | ○ | ○ |
| 24 | P13 | 6 | 70 | ○ | ○ | Δ | ○ | ○ |
| 25 | P9 | 42 | 50 | ○ | ○ | Δ | ○ | ○ |
| 26 | P9 | 42 | 50 | ○ | ○ | Δ | ○ | ○ |
| Comp. Ex. 4 | — | 69 | 0 | ○ | Δ | ◎ | ◎ | × |

EXAMPLE 27

Preparation of Transparent Substrate

In the same manner as in Example 1, a transparent substrate was produced.

Preparation of Coating Solution

A coating solution was prepared at the following mixing ratio by weight.

| | |
|---|---|
| ion exchange water | 10.55 parts |
| particle dispersion (same as in Example 12) | 68.34 parts |
| resin dispersion (shown in Table 5) | 20.71 parts |
| fluorescent whitening dye (Uvitex EBF 250%, manufactured by Ciba Specialty Chemicals K.K.) | 0.09 part |
| dilute surfactant (same as in Example 12) | 0.31 part |

EXAMPLES 30–38

In the same manner as in Example 27, except that the kinds of resin and particle, and the weight ratio of resin as shown in Table 5 were used, recording materials were obtained. The obtained recording materials had a total light transmittance that fell between 28.1% and 47.5%.

EXAMPLES 39, 40

In the same manner as in Example 27, except that silica particles (SYLOJET W900, manufactured by GRACE JAPAN KK.) and the weight ratios of the resin and particles as shown in Table 5 were used, recording materials were obtained. The obtained recording materials had a total light transmittance of 32.1% and 33.2%, respectively.

Comparative Example 5

In the same manner as in Example 27, except that the resin was partially hydrolyzed polyvinyl alcohol (PVA-217, manufactured by KURARAY CO., LTD.), a recording material was obtained. The obtained recording material had a total light transmittance of 42%.

The evaluation results of these films are summarized in Table 5.

TABLE 5

| Ex. No. | Aqueous disper-sion | Tg (° C.) | Particles/ resin | Grade of print 1 | Grade of print 3 | Grade of print 4 | surface strength | water resis-tance |
|---|---|---|---|---|---|---|---|---|
| 27 | P9 | 42 | 2.2 | ⊚ | ○ | Δ | ○ | ○ |
| 28 | P9 | 42 | 2.2 | ○ | ○ | Δ | ○ | ○ |
| 29 | P9 | 42 | 2.2 | ○ | ○ | Δ | ○ | ○ |
| 30 | P9 | 42 | 1.7 | ⊚ | ○ | Δ | ○ | ○ |
| 31 | P9 | 42 | 1.3 | ⊚ | ○ | Δ | ○ | ○ |
| 32 | P1 | 61 | 2.5 | ⊚ | ○ | Δ | ○ | ○ |
| 33 | P1 | 61 | 1.7 | ⊚ | Δ | Δ | ○ | ○ |
| 34 | P1 | 61 | 1.5 | ⊚ | × | Δ | ○ | ○ |
| 35 | P12 | 5 | 1.3 | ⊚ | ○ | ○ | ○ | ○ |
| 36 | P12 | 5 | 1.7 | ⊚ | ○ | ○ | ○ | ○ |
| 37 | P14 | 79 | 1.7 | ⊚ | ○ | Δ | ○ | ○ |
| 38 | P1 | 61 | 1.9 | ⊚ | ○ | Δ | ○ | ○ |
| 39 | P1 | 61 | 2.2 | ⊚ | Δ | Δ | ○ | ○ |
| 40 | P9 | 42 | 1.6 | ⊚ | ○ | Δ | ○ | ○ |
| Comp. | — | 69 | 1.7 | ○ | ○ | ⊚ | ○ | × |

EXAMPLE 41

Preparation of Transparent Substrate

In the same manner as in Example 1, a transparent substrate was produced.

Preparation of Coating Solution

Preparation for Making a Coating Solution

Water was added to silica particles (SYLYSIA 450, manufactured by Fuji Silysia Chemical LTD.) to a solid concentration of 25 wt % and the particles were dispersed in a homogenizer for 30 min at 5000 rpm to give a particle dispersion. A surfactant (MEGAFAC F-144D, manufactured by DAINIPPON INK AND CHEMICALS, INC.) was dissolved in the same amount of isopropyl alcohol, and diluted 5-fold with water to give a dilute surfactant having a solid concentration of 10 wt %.

Preparation of Coating Solution

A coating solution was prepared at the following mixing ratio in weight.

| | |
|---|---|
| ion exchange water | 6.24 parts |
| polyester resin (Vilonal MD1100, manufactured by Toyo Boseki Kabushiki Kaisha, solid concentration 30%) | 30.65 parts |
| above-mentioned particle dispersion | 62.52 parts |
| fluorescent whitening dye (Uvitex EBF 250%, manufactured by Ciba Specialty Chemicals K.K.) | 0.13 part |
| above-mentioned dilute surfactant | 0.46 part |

Preparation of Recording Material

The above-mentioned coating solution was applied to the aforementioned substrate with a #60 wire bar and the substrate was heated in an oven maintained at 160° C. for 3 min to give a recording material.

EXAMPLE 42

In the same manner as in Example 41 except that a wire bar #75 was used, a recording material was obtained.

EXAMPLE 43

In the same manner as in Example 41 except that a wire bar #44 was used, a recording material was obtained.

EXAMPLE 44

In the same manner as in Example 41 except that a wire bar #36 was used, a recording material was obtained.

EXAMPLE 45

In the same manner as in Example 41 except that the following coating solution was used, a recording material was obtained.

| | |
|---|---|
| ion exchange water | 5.44 parts |
| polyester resin (Vilonal MD1100, manufactured by Toyo Boseki Kabushiki Kaisha, solid concentration 30%) | 26.72 parts |
| particle dispersion (same as in Example 41) | 67.33 parts |
| fluorescent whitening dye (Uvitex EBF 250%, manufactured by Ciba Specialty Chemicals K.K.) | 0.11 part |
| dilute surfactant (same as in Example 41) | 0.40 part |

EXAMPLE 46

In the same manner as in Example 41 except that the following coating solution was used, a recording material was obtained.

| | |
|---|---|
| ion exchange water | 6.74 parts |
| polyester resin (Vilonal MD1100, manufactured by Toyo Boseki Kabushiki Kaisha, solid concentration 30%) | 33.08 parts |
| particle dispersion (same as in Example 41) | 59.55 parts |
| fluorescent whitening dye | 0.14 part |

-continued

| | |
|---|---|
| (Uvitex EBF 250%, manufactured by Ciba Specialty Chemicals K.K.) | |
| dilute surfactant (same as in Example 41) | 0.50 part |

The evaluation results of the recording materials obtained in Examples 41–46 are shown in Table 6.

TABLE 6

| Ex. No. | Total light transmittance substrate | Total light transmittance recording material | Color density reflection | Color density transmission | Grade of print 5 | Grade of print 6 |
|---|---|---|---|---|---|---|
| 41 | 90 | 28 | 1.41 | 2.22 | ○ | ○ |
| 42 | 90 | 24 | 1.40 | 2.34 | ○ | ○ |
| 43 | 90 | 35 | 1.40 | 2.07 | ○ | ○ |
| 44 | 90 | 43 | 1.43 | 1.89 | ○ | ○ |
| 45 | 90 | 25 | 1.39 | 2.30 | ○ | ○ |
| 46 | 90 | 32 | 1.32 | 2.09 | ○ | ○ |

EXAMPLE 47

Preparation of Particle Dispersion and Dilute Surfactant

Water was added to particles (SYLYSIA 450, manufactured by Fuji Silysia Chemical LTD.) to a solid concentration of 23 wt % and the particles were dispersed in a homogenizer for 30 min at 5000 rpm to give a particle dispersion A. A surfactant (MEGAFAC F-144D, manufactured by DAINIPPON INK AND CHEMICALS, INC.) was dissolved in the same amount of isopropyl alcohol as the surfactant, and diluted 5-fold with water to give a dilute surfactant B having a solid concentration of 10 wt %.

The starting materials and mixing ratio of the coating solution are as follows.

| | |
|---|---|
| ion exchange water | 20.34 parts |
| thermoplastic resin (Vilonal MD1500, manufactured by Toyo Boseki Kabushiki Kaisha, solid concentration 30% by weight) | 24.65 parts |
| particle dispersion A | 54.65 parts |
| dilute surfactant B | 0.37 part |

The above materials were mixed and stirred to give a coating solution.

Preparation of Recording Material

A white polyester film (G2323, 100μ, manufactured by Toyo Boseki Kabushiki Kaisha) was used as a substrate, on which the above-mentioned coating solution was applied with a #60 wire bar. The film was dried in an oven maintained at 160° C. for 3 minutes to give a recording material.

EXAMPLE 48

In the same manner as in Example 47 except that the following coating solution was used, a recording material was obtained.

| | |
|---|---|
| ion exchange water | 21.24 parts |
| thermoplastic resin (Vilonal MD1500, manufactured by Toyo Boseki Kabushiki Kaisha, | 27.24 parts |
| particle dispersion A | 50.62 parts |
| dilute surfactant B | 0.42 part |

Mixing and stirring followed Example 47.

EXAMPLE 49

In the same manner as in Example 47 except that the following coating solution was used, a recording material was obtained.

| | |
|---|---|
| ion exchange water | 19.61 parts |
| thermoplastic resin (Vilonal MD1500, manufactured by Toyo Boseki Kabushiki Kaisha, | 22.19 parts |
| particle dispersion A | 57.87 parts |
| dilute surfactant B | 0.33 part |

Mixing and stirring followed Example 47.

EXAMPLE 50

In the same manner as in Example 47 except that a wire bar #40 was used, a recording material was obtained.

EXAMPLE 51

In the same manner as in Example 47 except that a wire bar #75 was used, a recording material was obtained.

Comparative Example 6

Partially hydrolyzed polyvinyl alcohol (PVA-217, manufactured by KURARAY CO., LTD.) was cast in water at 18° C. and heated to 95° C. while stirring. The mixture was filtered through a 100 mesh filter to give a solution (hereinafter partially hydrolyzed solution) having a solid concentration of 17 wt %. Using this solution, a coating solution having the following composition was prepared. In the same manner as in Example 47 except that this solution was applied, a recording material was obtained.

| | | |
|---|---|---|
| ion exchange water | 1.49 | parts |
| Partially hydrolyzed solution | 43.49 | parts |
| particle dispersion A | 54.65 | parts |
| dilute surfactant B | 0.37 | part |

Mixing and stirring followed Example 47.

Comparative Example 7

In the same manner as in Example 47 except that a coating solution having the following composition was used, a recording material was obtained.

| | | |
|---|---|---|
| ion exchange water | 10.10 | parts |
| Partially hydrolyzed solution | 30.44 | parts |
| crosslinking agent (Sumimal M3, manufactured by Sumitomo Chemical Company, Limited, solid concentration 50% diluted product) | 4.44 | parts |
| particle dispersion A | 54.65 | parts |
| dilute surfactant B | 0.37 | part |

Mixing and stirring followed Example 47.

Comparative Example 8

Completely hydrolyzed polyvinyl alcohol (RS-117, manufactured by KURARAY CO., LTD.) was cast in water at 18° C. and heated to 95° C. while stirring. The mixture was filtered through a 100 mesh filter to give a solution (hereinafter completely hydrolyzed solution) having a solid concentration of 17 wt %. Using this solution, a coating solution having the following composition was prepared. In the same manner as in Example 47 except that this solution was applied, a recording material was obtained.

| | | |
|---|---|---|
| ion exchange water | 1.49 | parts |
| completely hydrolyzed solution | 43.49 | parts |
| particle dispersion A | 54.65 | parts |
| dilute surfactant B | 0.37 | part |

Mixing and stirring followed Example 1.

Comparative Example 9

In the same manner as in Example 47 except that a coating solution having the following composition was used, a recording material was obtained.

| | | |
|---|---|---|
| ion exchange water | 10.10 | parts |
| completely hydrolyzed solution | 30.44 | parts |
| crosslinking agent (Sumimal M3, manufactured by Sumitomo Chemical Company, Limited, solid concentration 50% diluted product) | 4.44 | parts |
| particle dispersion A | 54.65 | parts |
| dilute surfactant B | 0.37 | part |

Mixing and stirring followed Example 47.

The evaluation results of the recording materials obtained in Examples 47–51 and Comparative Examples 6–9 are shown in Table 7.

TABLE 7

| | Amount applied ($g/m^2$) | Color density Before treatment | Color density After treatment | Color density retention proportion (%) | Ourdoor exhibition |
|---|---|---|---|---|---|
| Example 47 | 34 | 1.41 | 1.49 | 106 | ○ |
| Example 48 | 33 | 1.32 | 1.38 | 105 | ○ |
| Example 49 | 33 | 1.39 | 1.34 | 96 | ○ |
| Example 50 | 24 | 1.44 | 1.49 | 103 | ○ |
| Example 51 | 41 | 1.39 | 1.39 | 100 | ○ |
| Comparative Example 6 | 36 | 1.34 | 0.40 | 30 | × |
| Comparative Example 7 | 34 | 1.32 | 1.02 | 77 | × |
| Comparative Example 8 | 35 | 1.36 | 0.52 | 38 | × |
| Comparative Example 9 | 33 | 1.33 | 1.12 | 84 | Δ |

The recording materials obtained in Examples 52–56 and Comparative Examples 10 and 11 were evaluated by the following methods.

(16) Surface Strength 1 (Surface Strength of Recording Material Before Printing)

A vinyl chloride laminate film (P307-RC, manufactured by LINTEC CORPORATION) was cut in 25 mm width×150 mm length and adhered to the surface of the ink absorption layer or the surface of the ink passage layer. Sufficient adhesion was secured by pressing the tape from above with a rubber roller. The laminate film was left standing at 23° C., 65 RH % for 30 minutes. The laminate film was peeled off by pulling by a film tensile tester (tensilon) at a rate of 200 mm/min. The maximum stress was taken as the surface strength, wherein the laminate film was peeled off at 180°.

Surface Strength 2 (Surface Strength of Recording Material After Printing)

Using pigment type ink jet printer (JV2-130, manufactured by MIMAKI Engineering CO., LTD.), pure ink was injected (black, cyanide, magenta, yellow) by 360 dpi at 100% and solid print was made. This ink at the density of the solid print was used for printing (ink amount about 32 $g/m^2$). The recorded paper was measured for surface strength according to the surface strength 1.

(17) Color Density Upon Transmission, Color Density Upon Reflection

Using a pigment type ink jet printer (JV2-130, manufactured by MIMAKI Engineering Co., LTD.) and pure ink, black ink was injected 100% at 720 dpi to give a black solid print. The black solid print was measured for color density by a Macbeth densitometer (TR-927), wherein the ink amount was about 32 $g/m^2$. For transmission, no filter was used but for reflection, an ortho-chromatic filter was used, which passes visible light alone.

(18) Workability

Using the same printer as used for the measurement of color density upon transmission and color density upon reflection, photo CD (manufactured by Eastman Kodak Company) image was printed on the entire surface of A1 and the image was left standing for 2 hours after printing. A laminate film which was the same as that used for the measurement of surface strength was adhered in the entirety using a laminator, and wound around at a diameter of 5 cm.

When the recording material was not separated from the laminate film, the material was evaluated as ○, when the material was partially separated but practical, it was evaluated as Δ, and when no practicality was found, the material was evaluated as X.

(19) Total Light Transmittance

Using a Poyic integrating sphere H.T.R meter (manufactured by NIPPON SEIMITSU KOUGAKU) and according to JIS-K6714, the total light transmittance was measured. The smaller the value, the higher the opacifying power.

(20) Recording Image Quality

Several kinds of photographic images were recorded using the above-mentioned printer. The quality of the recorded image was visually evaluated and rated in three ranks of ○ΔX. The maximum amount of the ink was 58 $g/m^2$.

○: No blurring etc. found and details were clearly expressed, vividness similar to silver salt photograph.

X: Details unclear due to blurring and the photographic image not vivid.

Δ: In between ○ and X.

(21) Use for Illumination 15W fluorescent lamps were placed at a distance of 10 cm from and parallel to the printed surface and at 5 cm intervals. The observer saw the image at a distance of 50 cm from transparent substrate side. When the light source looked constant, the image was evaluated as ○, and the light source looked like 2 sources, the image was evaluated as X.

EXAMPLE 52

An ink receiving layer and an ink passage layer were formed on a transparent polyester film (manufactured by Toyo Boseki Kabushiki Kaisha, light transmittance: 89%) to give a recording material for ink jet printing.

Ink Receiving Layer

A coating solution having the following solid content ratio was applied with a bar and dried at 120° C. for 5 minutes to give a receiving layer. The coated amount (dry) was 10 $g/m^2$.

| | |
|---|---|
| polyvinyl alcohol (GH-17, manufactured by Nippon Synthetic Chemical Industry Co., Ltd.) | 100 parts by weight |
| melamine resin (Sumimal M3, manufactured by Sumitomo Chemical Company, Limited) | 15 parts by weight |
| cationic compound (Kayafix UR, manufactured by NIPPON KAYAKU CO., LTD.) | 10 parts by weight |

Ink Passage Layer

A coating solution having the following solid content ratio was applied to the ink receiving layer with a bar and dried at 160° C. for 1 minute. The coated amount was 10 $g/m^2$.

| | |
|---|---|
| cationic acrylic resin (VONCOAT VO-8, manufactured by DIC Kabushiki Kaisha) | 10 parts by weight |
| melamine resin (8% AC, manufactured by Sumitomo Chemical Company, Limited) | 1 part by weight |
| organic particles (EPOSTAR-MS, manufactured by NIPPON SHOKUBAI CO., LTD.) | 60 parts by weight |
| silicon surfactant (PAINTAD 57, manufactured by DOW CORNING) | 3 parts by weight |

The recording material thus obtained was white and non-transparent. The recording material was subjected to ink jet recording.

Comparative Example 10

In the same manner as in Example 52 except that the ink passage layer contained organic particles in an amount of 120 parts by weight, a recording material was obtained. The material had low surface strength.

EXAMPLE 53

In the same manner as in Example 52 except that the ink passage layer did not contain melamine resin, a recording material was obtained.

EXAMPLE 54

In the same manner as in Example 52 except that the ink passage layer contained organic particles in an amount of 40 parts by weight, a recording material was obtained. The material had low surface strength.

Comparative Example 11

In the same manner as in Example 52 except that the amount applied on the ink passage layer was 30 $g/m^2$, a recording material was obtained.

EXAMPLE 55

A polyester film (A4100, 100μ, manufactured by Toyo Boseki Kabushiki Kaisha) was used, on which an ink receiving layer and an ink passage layer were formed by the following method to give a recording material.

An ink receiving layer was applied in the following composition and solid content ratio with a bar, and dried at 160° C. for 3 minutes to give a recording material. The amount coated was 15 $g/m^2$ after drying.

| | |
|---|---|
| Anionic water absorptive polymer (ACCOGEL-A, manufactured by MITSUI SYTEC LTD) | 16 parts by weight |
| cationic water absorptive polymer (ACCOGEL-C, manufactured by MITSUI SYTEC LTD) | 16 parts by weight |
| acrylic resin (Acrydic A-1300, manufactured by DIC) | 12 parts by weight |

[Ink Passage Layer]

A coating solution was applied at the following solid content ratio with a bar, and dried at 120° C. for 2 minutes to give a recording material. The amount coated was 9 $g/m^2$ after drying.

| | |
|---|---|
| particles (EPOSTAR-MS, manufactured by NIPPON SHOKUBAI CO., LTD.) | 30 parts by weight |
| resin (VYLON GK78CS, manufactured by Toyo Boseki Kabushiki Kaisha) | 5 parts by weight |
| resin (isocyanate CORONATE 2507, manufactured by NIPPON POLYURETHANE INDUSTRY CO., LTD.) | 1 part by weight |
| surfactant (PAINTAD 57, manufactured by DOW CORNING) | 3 parts by weight |

EXAMPLE 56

The following ink receiving layer was formed on the polyester film of Example 52.

A coating solution was applied at the following solid content ratio with a bar, and dried at. 120° C. for 5 minutes to form an ink receiving layer. The amount coated was 10 g/m[2] after drying.

| | |
|---|---|
| polyvinyl alcohol (GH-17, manufactured by Nippon Synthetic Chemical Industry Co., Ltd.) | 10 parts by weight |
| melamine resin (Sumimal M3, manufactured by Sumitomo Chemical Company, Limited) | 1.5 parts by weight |
| cationic compound (Kayafix UR, manufactured by NIPPON KAYAKU CO., LTD.) | 1 part by weight |
| particles (EPOSTAR-MS, manufactured by NIPPON SHOKUBAI CO., LTD.) | 60 parts by weight |

EXAMPLE 57

The recording material (30 m) of Example 52 was wound around a paper tube having an inner diameter of 2 inches (5.08 cm), set in the aforementioned printer JV2-130, and printed by 720 dpi at A0 size. The aforementioned laminate film (P307-RC) was applied in the entirety thereof to give an illumination signboard. The signboard was beautiful with or without fluorescent light from the back.

The evaluation results of the materials are shown in Tables 8, 9.

TABLE 8

| | Surface strength 1 | Surface strength 2 (g/cm) | | | |
|---|---|---|---|---|---|
| | (g/cm) | K* | C* | M* | Y* |
| Example 47 | 250 | 220 | 230 | 210 | 230 |
| Comparative Example 11 | 60 | 50 | 50 | 30 | 40 |
| Example 48 | 90 | 80 | 80 | 80 | 90 |
| Example 49 | 280 | 270 | 260 | 270 | 250 |
| Comparative Example 12 | 70 | 200 | 190 | 180 | 200 |
| Example 50 | 210 | 200 | 200 | 210 | 210 |
| Example 51 | 300 | 290 | 270 | 260 | 270 |
| Example 52 | 180 | 190 | 190 | 180 | 160 |

Note
*K: black C: cyanide M: magenta Y: yellow

TABLE 9

| | Color density upon reflection | Light transmission (%) | Workability | Recording picture quality | Use for illumination |
|---|---|---|---|---|---|
| Example 47 | 1.47 | 35 | ○ | ○ | ○ |
| Comparative Example 11 | 1.42 | 24 | × | ○ | ○ |
| Example 48 | 1.52 | 36 | Δ | ○ | ○ |
| Example 49 | 1.60 | 31 | ○ | Δ | Δ |
| Comparative Example 12 | 1.72 | 23 | × | ○ | ○ |
| Example 50 | 1.55 | 34 | ○ | ○ | ○ |
| Example 51 | 1.48 | 51 | ○ | × | × |
| Example 52 | 1.59 | 34 | ○ | ○ | ○ |

The recording material thus obtained affords sharp recording of images having extremely high water resistance and free of bleeding by the ink jet recording method particularly using oily ink. The material hardly curls even under severe environment associated with radically changing humidity, temperature and the like, thereby ensuring stable transportability of the recording material without trouble caused by being in contact with a priting head.

When used as an illumination signboard, moreover, the recording material affords superior recording of high picture quality images that are maintained when the illumination signboard is on or off. In addition, such high grade images can be also obtained using aqueous ink.

This application is based on a patent application Nos. 150900/1999, 149299/1999, 151546/1999, 150094/1999, 150776/1999, 122743/1999, 122742/1999, 150095/1999 and 150442/1999 filed in Japan, the content of which is hereby incorporated by reference.

What is claimed is:

1. A recording material comprising a substrate and an ink receiving layer formed thereon, wherein said substrate has a thickness of 38–200 μm, said ink receiving layer is a porous layer comprising particles and a water non-absorptive thermoplastic resin and has a thickness of not less than 50 μm and not more than 105 μm, wherein the recording material has a curl value of not more than +10 mm, and weight ratio (A/B) of the particles (A) to the thermoplastic resin (B) satisfies the following formula:

$$A/B \geqq 1.2.$$

2. The recording material of claim 1, wherein the substrate is transparent, and the recording material satisfies the relationship between a color density T upon transmission of light and a color density R upon reflection of light, as expressed by the following formula, with regard to a black solid paint formed on the ink receiving layer:

$$1.20 \times R \leqq T \leqq 1.70 \times R.$$

3. The recording material of claim 1, wherein the ink receiving layer has a color density retention proportion of not less than 95%.

4. The recording material of claim 1, wherein the thermoplastic resin has a Tg of not less than −5° C. and not more than 100° C.

5. The recording material of claim 1, wherein said thermoplastic resin is a polyester thermoplastic resin.

6. The recording material of claim 2, wherein said thermoplastic resin is a polyester thermoplastic resin.

7. The recording material of claim 1, wherein said substrate is a polyester resin sheet.

8. The recording material of claim 1, wherein said particles are silica particles.

9. The recording material of claim 1, wherein the recording material comprises a translucent substrate A and an ink absorption layer B formed on one side of the substrate A, which is obtained by ink absorption and setting from the ink absorption layer side and is used for appreciation from the substrate side, wherein the ink absorption layer has a surface strength of not less than 80 g weight/cm.

10. The recording material of claim 9, wherein the ink absorption layer comprises pigment ink absorbed and set therein.

11. The recording material of claim 9, wherein the ink absorption layer is a layer wherein pigment ink has been absorbed.

12. The recording material of claim 9, wherein the ink is aqueous pigment ink.

13. The recording material of claim 9, wherein the ink is used in an amount of not less than 10 $g/m^2$ and not more than 70 $g/m^2$.

14. The recording material of claim 9, wherein the ink absorption layer B comprises a porous or non-porous ink receiving layer B1 and an ink passage layer B2, that are layered in the order of A/B1/B2.

15. The recording material of claim 9, which has a light transmittance of an unprinted part of not less than 25% and not more than 40%.

16. The recording material of claim 9, which has a color (black) density upon transmission of not less than 2.0.

17. The recording material of claim 9, which has a color (black) density upon reflection of not less than 1.3.

18. The recording material of claim 9, which is wound on a tube having an outer diameter of not less than 5 cm and not more than 10 cm in a length of not less than 5 m and not more than 100 m.

19. A recording material comprising a recording material of claim 9 and a laminate film comprising a substrate and an adhesive, said laminate being adhered to the recording material.

20. The recording material of claim 19, wherein the laminate film comprises a substrate film selected from the group consisting of polyester, polyolefin and vinyl chloride, and an adhesive.

21. The recording material of claim 9, which is obtained by printing the ink on the absorption layer with an ink jet printer and which is appreciated from the substrate side.

22. The recording material of claim 9, further comprising a crosslinking agent selected from the group consisting of isocyanate resin, melamine resin and epoxy resin, in the ink absorption layer.

23. The recording material of claim 22, wherein the ink absorption layer is an ink passage layer.

24. The recording material of claim 4, wherein said thermoplastic resin is a polyester thermoplastic resin.

25. The recording material of claim 1, wherein the ink receiving layer is a porous layer formed by applying a coating solution mainly comprising water, particles, and a water non-absorptive thermoplastic resin, and drying the layer, and the coating solution comprises a water soluble solvent having a high boiling point of not less than 150° C., in a proportion satisfying the following formulas:

$$S \geqq Tg-30$$

$$S \leqq Tg+70$$

wherein S is a proportion (parts by weight) of the water soluble solvent having a high boiling point of not less than 150° C., to the thermoplastic resin (100 parts by weight), and Tg is a glass transition temperature (°C.) of the water non-absorptive thermoplastic resin.

26. The recording material of claim 1, wherein a weight ratio (A/B) of the particles (A) to the thermoplastic resin (B), and a relationship between the weight ratio and a glass transition temperature (Tg) of the thermoplastic resin are expressed by the following formulas:

$$A/B \geqq Tg/100+0.8$$

$$A/B \leqq Tg/100+7.0.$$

27. The recording material of claim 26, wherein the weight ratio (A/B) of the particles (A) to the thermoplastic resin (B) and the relationship between the weight ratio and the glass transition temperature (Tg) of the thermoplastic resin are expressed by the following formulas:

$$A/B \geqq Tg/100+0.8$$

$$A/B \leqq Tg/100+1.9.$$

28. The recording material of claim 8, wherein the silica particles have an average particle size of 0.1 $\mu$m to 30 $\mu$m and comprise fine pores having a diameter of 10–2000 Å.

* * * * *